US012461786B2

(12) United States Patent
Asa et al.

(10) Patent No.: US 12,461,786 B2
(45) Date of Patent: Nov. 4, 2025

(54) HARDWARE ACCELERATOR FOR COMPUTING AN ALGEBRAIC FUNCTION

(71) Applicant: INGONYAMA LTD., Petach Tikva (IL)

(72) Inventors: Michael Asa, Kfar Sava (IL); Omer Shlomovits, Petach Tikva (IL); Daniel Shterman, Petach Tikva (IL); Yuval Domb, Raanana (IL)

(73) Assignee: INGONYAMA LTD., Petach Tikva (IL)

( * ) Notice: Subject to any disclaimer, the term of this patent is extended or adjusted under 35 U.S.C. 154(b) by 468 days.

(21) Appl. No.: 18/103,087

(22) Filed: Jan. 30, 2023

(65) Prior Publication Data
US 2024/0256350 A1    Aug. 1, 2024

(51) Int. Cl.
*G06F 9/50* (2006.01)
*G06F 7/72* (2006.01)
*G06F 9/48* (2006.01)

(52) U.S. Cl.
CPC ............ *G06F 9/5044* (2013.01); *G06F 7/722* (2013.01); *G06F 9/4881* (2013.01); *G06F 9/5016* (2013.01)

(58) Field of Classification Search
CPC .................................................... G06F 9/5044
See application file for complete search history.

(56) References Cited

FOREIGN PATENT DOCUMENTS

CN        112632888        *  8/2024

OTHER PUBLICATIONS

Y. Zhang et al., "PipeZK: Accelerating Zero-Knowledge Proof with a Pipelined Architecture," 2021 ACM/IEEE 48th Annual International Symposium on Computer Architecture (ISCA), Valencia, Spain, 2021, pp. 416-428, doi: 10.1109/ISCA52012.2021.00040. (Year: 2021).*
Lorenzo Grassi et al. "Poseidon: a New Hash Function for Zero-Knowledge Proof Systems (Updated Version)". <URL: https://eprint.iacr.org/2019/458.pdf>.

* cited by examiner

*Primary Examiner* — Charlie Sun
(74) *Attorney, Agent, or Firm* — Oliff PLC

(57) ABSTRACT

A multi-thread processor computes a function requiring only modular additions and multiplications. Memories store constants, multi-bit elements, and multiple instruction sets. A multiplier receives first and second multiplier operands, generates their product, which is fed to an adder as a first operand and added to a second adder operand, the sum being stored in an accumulator memory. Each instruction set is executed on a successive clock, and includes instructions for defining respective addresses in the memories from which constants, elements and sums are to be accessed. A scheduler maintains a schedule of threads executable by the processor in parallel, and is configured on each successive clock to cycle through the threads and initiate a first available thread. Selectors responsive to instructions received from the program memory select the required multiplier and adder operands. A multi-core system executes multiple parallel threads on multiple processors allowing complex functions to be computed efficiently.

15 Claims, 13 Drawing Sheets

HARDWARE ACCELERATOR FOR COMPUTING AN ALGEBRAIC FUNCTION

FIELD OF THE INVENTION

This invention relates generally to firmware for the computation of zero-knowledge (commonly abbreviated to 'zk') friendly hash functions and more specifically to use thereof in proof generation and proof verification for zk-protocols such as zk-SNARK. Within the context of the following description and the appended claims, zk-friendly hash functions may be executed by a combination of multiplications and additions only. In other words, the invention relates to algebraic hash functions.

BACKGROUND OF THE INVENTION zk-SNARK, one of a family of zk protocols, is an acronym for "Zero-Knowledge Succinct Non-Interactive Argument of Knowledge," and refers to a proof construction where one can prove possession of certain information, e.g., a secret key, without revealing that information, and without any interaction between the prover and verifier. Zero-knowledge algorithms are used in encryption systems to allow users to demonstrate that they are authorized to carry out a transaction by submitting a statement that reveals no information beyond the validity of the statement itself. Proof of legitimacy is not a rigorous mathematical proof but, rather, a statistical construct based on the improbability of a highly complex mathematical computation reaching a correct solution starting from an incorrect or fraudulent hypothesis.

Filecoin is an open-source, public cryptocurrency and digital payment system based on a blockchain cooperative zero-knowledge digital storage and data retrieval method. The parties that are part of the storage network include people who can provide storage referred to as "miners" and people who want to store files referred to as "users". The miners can elect to provide storage for the filecoin network and earn units of cryptocurrency called (FIL). The blockchain maintains a ledger for FIL accounts, transactions, records and implements a virtual machine state that can execute smart contracts that can connect deals between miners and users. The miners participate in a consensus protocol that maintains the integrity of the blockchain. The main "work" of the miner is to provide a cryptographic "proof of storage". The proofs of storage and the amount of storage provided leverage the miners' power in the consensus protocol.

Hash functions operate on large input strings and generate a number constituted by an output string of significantly reduced length. The hash function cannot be applied in reverse, so it is impossible to derive the input string merely from a knowledge of the hash function and its resultant output string. The result of the hash function is not unique in the sense that the same output string may be generated by applying the same hash function to different input strings. However, a given output string is characteristic of the input string and serves as proof that the hash function when applied to the input string would generate the given output string. It is this feature that makes hash functions valuable in applications requiring authentication and proof. For example, a hash function applied to a document serves as proof that the document received by a recipient is the same as was transmitted by the author. A hash is used to only verify the message integrity—if a message changes, the hash of a message will change, too. In use the file is transmitted to the recipient together with the hash of the file as computed by a known hash function. The recipient runs the same hash function on the received file and if the result matches the received hash of the original file, it is assumed that the received file is faithful to the original.

As computer hardware becomes ever more powerful, hash functions that were once considered secure, such as the Message Digest (MD) family of cryptographic hash functions, can no longer be trusted for all applications. This is particularly acute for zero-knowledge proof systems and has led to the proposal of more sophisticated hash functions, of which an example is Poseidon as disclosed in:

Lorenzo Grassi et al., "*Poseidon: A New Hash Function for Zero-Knowledge Proof Systems*" available on-line from https://eprint.iacr.org2019/458.pdf.

Poseidon reduces an input string comprising a number of elements of known length to a single element of the same length. The number of elements in the input string is designated by n, which may be equal to 3, 7, 9 or 12 and, in order to indicate the number of elements that are processed during each implementation of the algorithm, we refer to Poseidon-n. The suffix n indicates the factor by which the input string is reduced. For example, a single Poseidon-12 process reduces an input string having 12 words each having 256 bits to a single 256-bit word. Optionally, if there are only 11 words to hash, one of the words is a constant as explained in more detail below. Throughout this description, we use the terms 'elements' and 'words' interchangeably. In practice, multiple processes are used to hash much larger input strings by successively generating from different groups of 12 words respective output strings, elements of which are then successively hashed in like manner until only a single word remains, which constitutes the final hash result having 256 bits.

We describe the essential operation of an optimized Poseidon hash function with reference to FIGS. 1a to 1c of the drawings. It is assumed that an initial state is defined by 12 registers or accumulators designated $a_0$ to $a_{n-1}$, w here n=12 for Poseidon-12 and more generally is equal to n, each of which contains a string of 256 characters. In some versions of the Poseidon hash function, the contents of the accumulators may be pre processed prior to applying the hash function; but this makes no difference to the manner in which the algorithm proceeds since it simply means that the values $a_0$ to $a_{n-1}$, will be different. The first stage in the algorithm is to raise the contents of each accumulator to the exponent 5. This and all other computations are done using modular arithmetic using for the modulus a prime number having 256 bits, and ensures that the results of all additions and multiplications have only 256 bits. To each resulting power we then add a respective constant designated $c_{0,r}$ to $c_{n-1,r}$, where r is the index of the current round starting at r=0. The constants are predetermined and are typically different for each accumulator. Since a constant is added to each accumulator, this stage of the algorithm is termed a "full round" and is distinguished from a partial round in a subsequent stage where constants are added to only one accumulator. The resulting state is shown as $a'_0$ to $a'_{n-1}$, The result in each accumulator may be regarded as a single column 256-bit vector having n rows, which is now multiplied by a n×n full matrix, $$\mathcal{M}: \begin{pmatrix} a_{11} & a_{12} & a_{13} \ldots a_{1n} \\ a_{21} & a_{22} & a_{23} \ldots a_{2n} \\ a_{31} & a_{32} & a_{33} \ldots a_{3n} \\ \vdots & \vdots & \vdots \\ a_{n1} & a_{n2} & a_{n3} \ldots a_{nn} \end{pmatrix} \times \begin{pmatrix} b_1 \\ b_2 \\ b_3 \\ \vdots \\ b_n \end{pmatrix} = \begin{pmatrix} a_{11}b_1 + a_{12}b_2 + a_{13}b_3 \ldots + a_{1n}b_n \\ a_{21}b_1 + a_{22}b_2 + a_{23}b_3 \ldots + a_{2n}b_n \\ a_{31}b_1 + a_{32}b_2 + a_{33}b_3 \ldots + a_{3n}b_n \\ \vdots \\ a_{31}b_1 + a_{32}b_2 + a_{33}b_3 \ldots + a_{nn}b_n \end{pmatrix}$$

For the sake of clarification, it will be appreciated that the size of the matrix is the same as the Poseidon suffix. So, when using Poseidon to hash an input string having twelve elements, n=12. It will also be understood that the only difference between Poseidon-12 and Poseidon-9 is the number of elements in the input string on which the Poseidon function operates and this, of course, determines the size of the matrix.

The result of the full matrix multiplication, State x $\mathcal{M}$ is a new 12-word string each of 256 bits in length shown as $a_0$ to $a_{n-1}$, these values obviously being different than the original initial state but serving as a new initial state for a subsequent round, since this whole process is now performed three times (i.e., $R_f=4$), or as many times as prescribed, each time using the same constants. In one version of the algorithm as shown in FIG. 1a, the process is then repeated one more time using different constants.

In the next stage of the algorithm shown in FIG. 1b, the process is repeated but only in respect of the first word $a_0$, which is raised to the exponent 5, and a constant $c_{0,r}$ being added to the result, defining a new state denoted in the figure by a' rather than a to indicate that the elements have changed. This state is multiplied by an n×n sparse matrix, $\mathcal{M}'$ as follows:

$$\begin{pmatrix} a_{11} & a_{12} & a_{13} & \ldots & a_{1n} \\ a_{21} & 1 & 0 & \ldots & 0 \\ a_{31} & 0 & 1 & \ldots & 0 \\ \vdots & 0 & \vdots & \vdots & \vdots \\ a_{n1} & 0 & 0 & \ldots & 1 \end{pmatrix} \times \begin{pmatrix} b_1 \\ b_2 \\ b_3 \\ \vdots \\ b_n \end{pmatrix} = \begin{pmatrix} a_{11}b_1 + a_{12}b_2 + \ldots a_{1n}b_n \\ a_{21}b_1 + b_2 \\ a_{31}b_1 + b_3 \\ \vdots \\ a_{n1}b_1 + b_n \end{pmatrix}$$

It is seen that the first row and column of the sparse matrix are identical to those of the full matrix shown above. The diagonal elements $a_{kk}$ for $1<k\leq n$ are equal to one and all other elements are zero. This process is referred to as a 'partial round' and is repeated for 57 cycles, i.e., $R_p=57$, each time with a different sparse matrix. It is noted that the Poseidon function as originally developed uses only full matrix multiplication, but was later optimized to employ sparse matrix multiplication which is faster. The term 'optimized' when applied to use of the Poseidon function denotes that sparse matrix multiplications is used for the partial rounds. Although optimized Poseidon is obviously faster, it is not a requirement of the present invention to use the optimized version of Poseidon when using Poseidon as the algebraic hash function.

In the next and final stage of the algorithm shown in FIG. 1c, the first stage of the process shown in FIG. 1a is repeated three times for a full round with different constants in each round, followed by full matrix multiplication and then a final full round with different constants followed again by full matrix multiplication to produce the out state, denoted by words $a_0$ to $a_{n-1}$, where n=12. The second word $a_1$ is then taken as the hash result, such that the original 12-word string each of length 256 bits has now been reduced to a single 256-bit word. It will be understood that whether the same or different constants are used for each round is a matter of implementation. In either case, the constants are selected by means of the program memory supplying a specific address to the constants memory. If two instructions direct the constants memory to output from the same address, then of course the constants will be the same; otherwise, they will be different if the two different addresses store different constants.

It is apparent that successive rounds of the algorithm shown in FIGS. 1a to 1c, have respective indices, r equal to 0 . . . 3, 4 . . . 60 and 61 . . . 64.

In many practical implementations, hash functions are applied to strings that are much longer than 256*12 i.e., 3,072 bits. These can be hashed by partitioning the input string into discrete groups each of 3,072 bits and applying Poseidon or a similar hash function to each group. The hash result of each group reduces the input string to a single 256-bit word, which are then grouped to form a reduced number of input strings that are hashed in similar manner, this process being repeated as often as necessary until the final hash result. It is common to perform this iterative process using a Merkle tree.

SUMMARY OF THE INVENTION

The present invention presents a hardware accelerator for implementing algebraic functions. Embodiments will be described with particular reference to hash functions of which Poseidon is an example. In saying this, two caveats are in order: first, the name Poseidon embraces a family of hash functions and is therefore not to be construed as a monolithic term. For example, it includes a basic hash function and an optimized function; and optionally some pre-processing may be carried out prior to performing the hash. Furthermore, as noted above, the number of elements hashed during any single implementation of Poseidon is itself variable. Our second caveat is that we relate to Poseidon by way of example only. Thus, Poseidon is representative of algebraic hash functions, which for our purpose are characterized by their being executable by a combination of multiplications and additions only.

There are three distinct aspects to the invention and they are described separately below. The first aspect is a single Poseidon (or similar) processor that operates on a 12-word 256-bit string to perform a hash function. The Poseidon processor is a hardware accelerator, which performs the hash function as described above with reference to FIGS. 1a to 1c of the drawings. The second aspect is the use of parallel processors to perform multiple hashes simultaneously in combination with a Merkle tree structure to derive the hash function of a large string. The third aspect is an optimized hash function generator, which employs the Merkle tree structure with multiple parallel cores together with a novel ring structure that optimizes the computation.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols.

Figure 2:
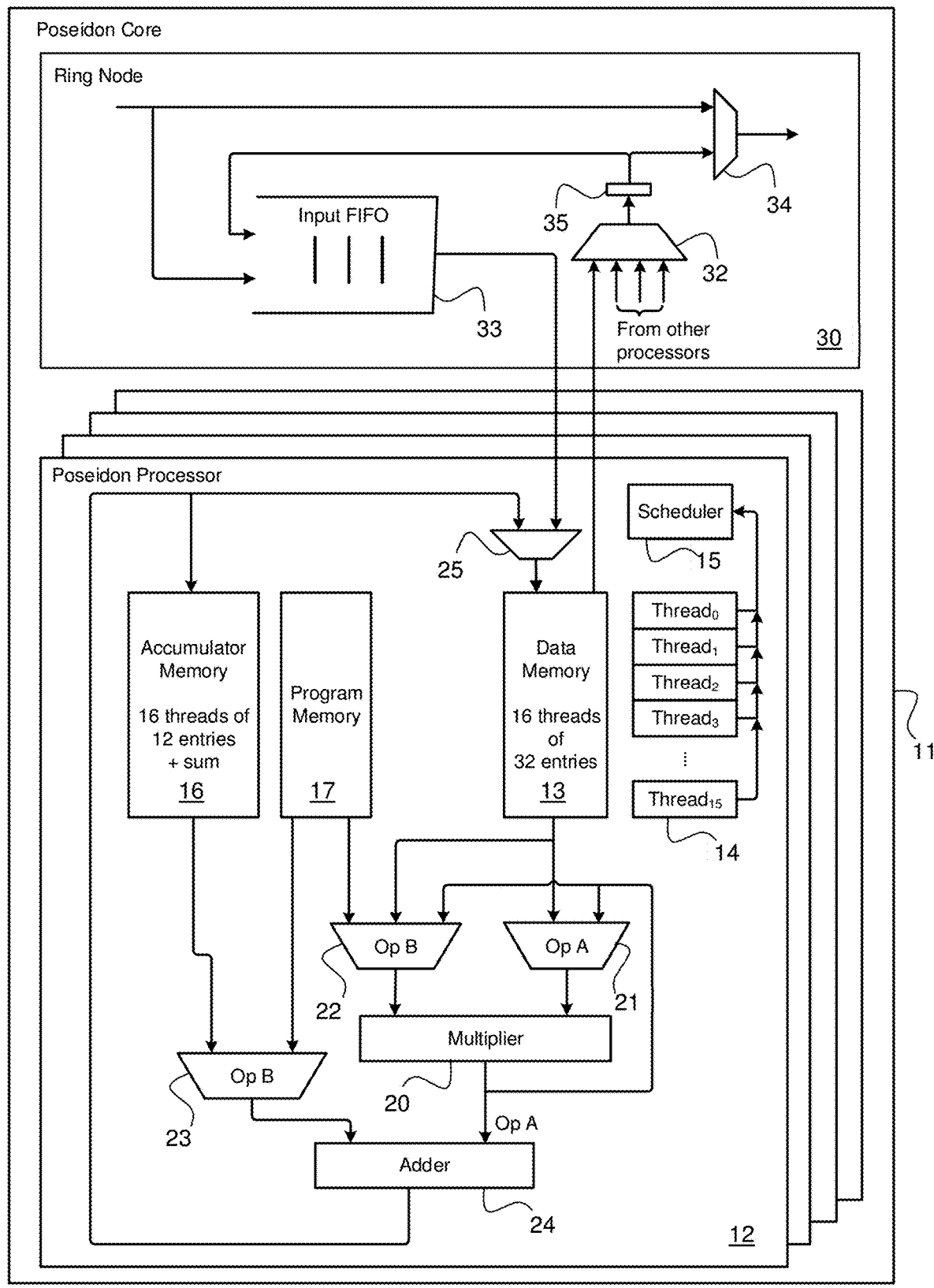
FIG. 2 is a block diagram showing the functionality of a hardware accelerator according to an embodiment of the invention.

FIG. 2 is a block diagram showing a partial detail of a hardware accelerator for generating an algebraic hash function according to an embodiment of the invention. As noted previously, this is described by way of non-limiting example with reference to the Poseidon hash function. The hardware accelerator comprises at least one Poseidon core 11 each having a stack of Poseidon processors 12. In some embodiments of the invention, there are eight cores each having four processors. Each processor 12 has a data memory 13, which may be a Block Random Access Memory (BRAM) in which is stored the input string comprising twelve 256-bit words. As will be explained in more detail below, this is true for a single implementation of the Poseidon-12 hash performed on an input string having only twelve words, one of which may be a constant in certain protocols. In typically scenarios, there is a need to generate a hash function on much longer input strings and this is done by recursive implementation of the hash function on successive hash results until only a single hash result remains. Each successive implementation requires its own constants, which may or not be identical between iterations and which, of course, must be predefined and stored. Each Poseidon processor 12 serves multiple threads 14 that run sequentially, and each of which executes a Poseidon hash on a certain group of inputs. When a thread is waiting for the result to return, it goes into idle and another thread is served. Thread management is performed by a scheduler 15, which can process sixteen threads concurrently, shown as $Thread_0$ to $Thread_{15}$. Operation of the scheduler 15 is known per se and is not itself a feature of the invention. Each thread is flagged as valid (i.e., available) or invalid (i.e., idle) and the scheduler runs through all sixteen threads sequentially and selects the first available thread. The data pertaining to the selected thread are extracted from the respective memories and routed to the multiplier and adder 21, as appropriate. This thread will now operate under its own steam in accordance with the instructions in the program memory, which are accessed and executed for each clock. As noted above, the thread goes into idle when it is waiting for the result to return. At this stage, it is flagged invalid and the scheduler 15 repeats the process of acquiring the first available thread flagged as valid, which will obviously now point to a different thread in the register. By such means, different threads are initiated whenever a thread goes idle so that, in practice, multiple threads are continually initiated and executed in tandem. An accumulator memory 16 stores sixteen threads each having twelve 256-bit words, and a program memory 17 stores the constants $c_{0,r}$ to $c_{n-1,r}$ described above as well as program code that controls operation of each of the memory and logic units for each clock pulse (not shown). It should be noted that the constants $c_{0,r}$ to $c_{n-1,r}$ are required only when using Poseidon for implementation of Filecoin and are not part of the Poseidon algorithm per se. Regardless of the specific end-use to which the processor is put, additional constants corresponding to the matrix coefficients $a_{11} \ldots a_{nn}$ must be stored for executing the matrix multiplications.

For Poseidon-12 and Poseidon-9 there are ~2600 constants for the multiplier and ~200 constants for the adder so in an embodiment reduced to practice, a single constants memory of sufficient size to accommodate 4,000 constants was used since this should address most if not all currently used hash functions. In saying this, the invention is neither limited to Poseidon nor even to computation of hash functions. It could also be employed, for example, to perform fast multiplication of large matrices, which might require a larger number of constants, typically the sum of the product of the numbers of rows and columns for each matrix. Therefore, the size of the memory or partition dedicated to storing the constants is determined by the application to which the system is being used.

All inputs and intermediate calculation results are stored in the data memory 13, which has a write port to store inputs and a result and a read port to feed the adder and multiplier inputs. It will be appreciated that although we show the three memory modules 13, 16 and 17 as discrete functional units, they can be implemented by a common memory having separately addressable partitions for storing program instructions, adder constants and multiplier constants. As is described below with reference to FIG. 8 of the drawings, in a practical implementation data is fed to these memories from an external memory system by means of a host interface, which is programmed to route the data to the appropriate memory or memories and which, of course, maintains a directory of where each different type of data is stored.

Data constituted by 256-bit words are fed from the data memory 13 to a multiplier 20 via first and second multiplexers 21 and 22 shown also as Op A and Op B, respectively since they supply the two operands Op A and Op B to the multiplier. The first multiplexer 21 feeds a selected one of two inputs to the multiplier 20, these being the current word fed from the data memory 13 or the resulting multiplication output from the multiplier 20. The second multiplexer 22 feeds a selected one of three inputs to the multiplier 20, these including the current word fed from the data memory 13 and the resulting multiplication output from the multiplier 20 in addition to a third input fed from the program memory 17. An output from the program memory 17 is also fed via a third multiplexer 23 to a first input of a 2-input adder 24 to whose second input is fed the output of the multiplier 20. The output of the adder 24 is fed back to the accumulator memory 16 and, via a fourth multiplexer 25 to the data memory 13.

Figure 3:
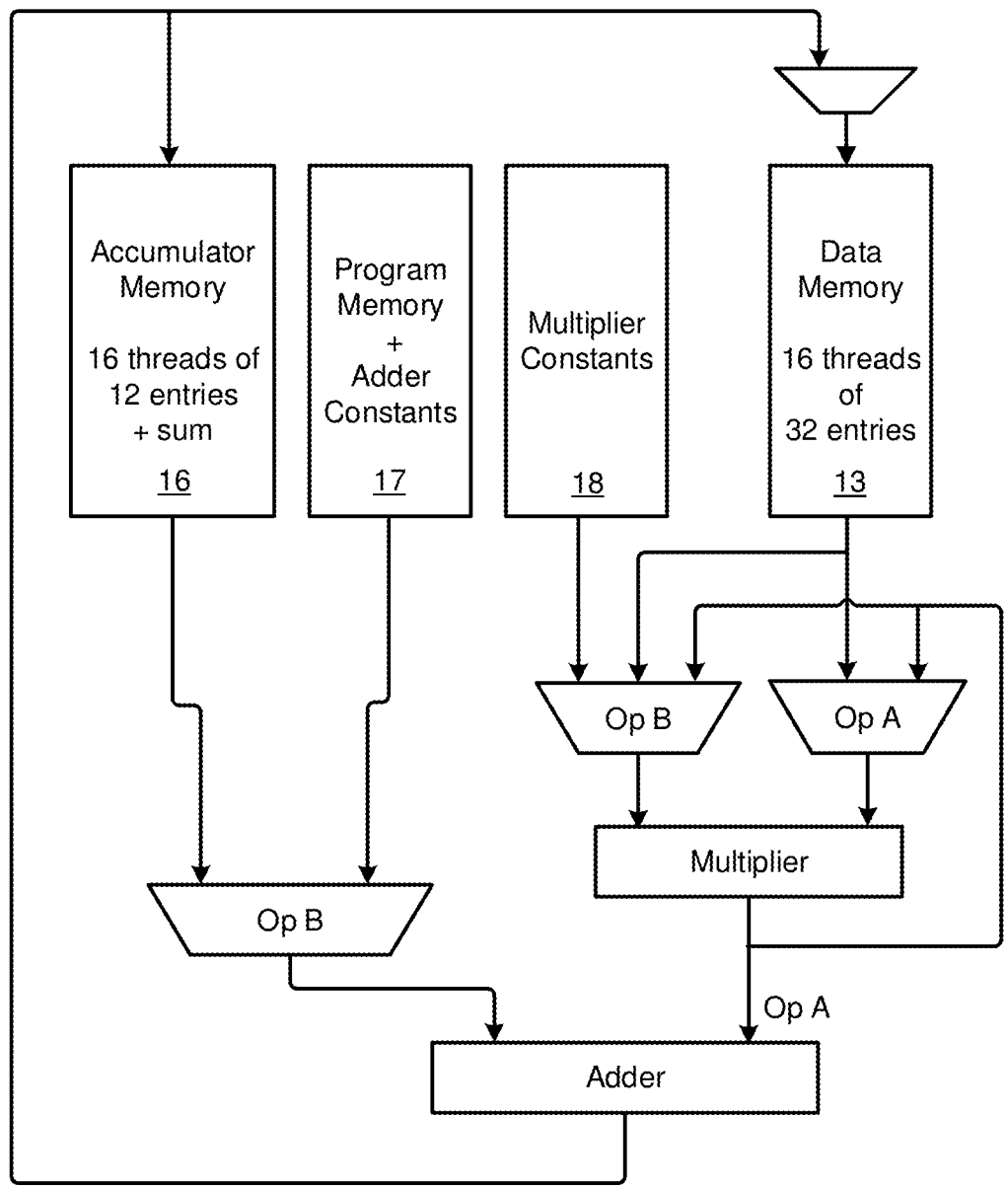
FIG. 3 shows a partial detail of a processor having separate memories for storage of adder and multiplier constants.

FIG. 3 shows a partial detail of the processor according to an alternative arrangement having separate memories for storage of the adder and multiplier constants. The adder constants are stored in a separate partition of the program memory 17, while the multiplier constants are stored in a separate dedicated memory 18. Such an arrangement may be preferable for those hash protocols that require relatively few adder constants but many more multiplier constants. Other hash protocols may make it more economical for a smaller number of multiplier constants to share the program memory and for the adder constants to be stored in a discrete dedicated memory. In yet another arrangement, separate memories could be provided for storage of the adder and multiplier constants, in addition to the program memory 17 used to store only program instructions. In all cases, the program instructions determine which multiplexer select line is operative for each successive clock signal and which memory address to route to the selected line.

Figure 4:
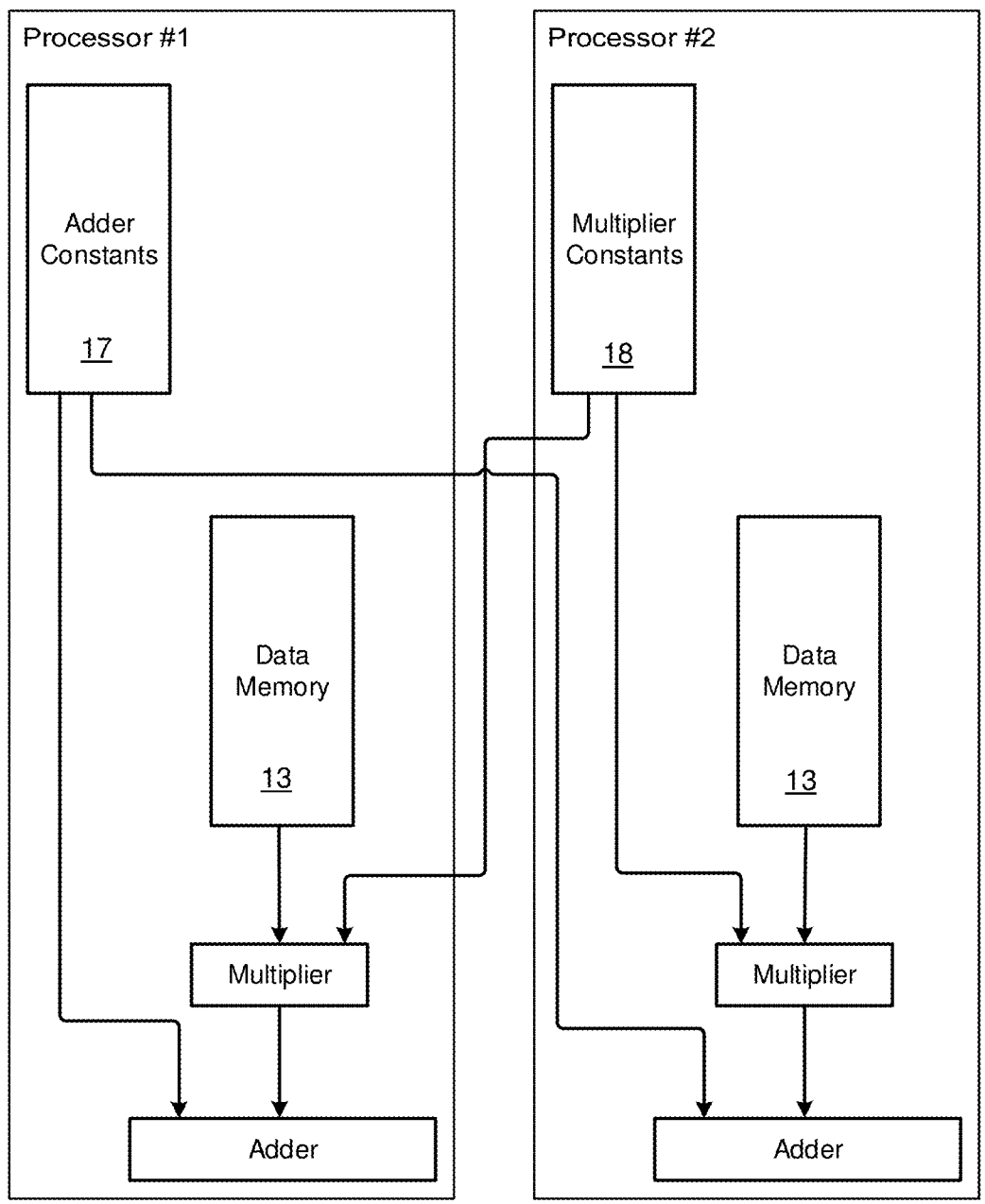
FIG. 4 shows a partial detail of a dual-processor core having shared memories for storage of adder and multiplier constants.

FIG. 4 shows yet another variation where a dual processor core utilizes shared memories. Thus, a first processor includes a memory 17 for adder constants while a second processor includes a memory 18 for multiplier constants. For the sake of simplicity, the multiplexers and additional connections to the multipliers and adders are omitted. Although in this particular example, the adder and multiplier constants are shared between different processors of the same core, the same principle may be extended also to the program memory, the data memory and the accumulator memory any or all of which may likewise be shared between different processors of the same core.

The accumulator 16 stores intermediate sums, which are then added to the output of the multiplier 20. To this end, the output of the accumulator memory 16 serves as an input to the third multiplexer 23, which thus feeds to the adder 24 either the instantaneous sum from the accumulator memory 16 or a constant from the program memory 17. This is best understood in the context of matrix multiplication. Thus, we can consider the first row of the full matrix, $\mathcal{M}$, shown above:

$$a_{11}b_1 + a_{12}b_2 + a_{13}b_3 \ldots + a_{1n}b_n$$

The first row of the partial matrix $\mathcal{M}'$ is, of course, identical although subsequent rows of the sparse matrix have only a single multiplication followed by addition of a single constant, e.g., $a_{21}b_1+b_2$.

In both cases it is seen that each matrix operation requires multiplication of an element $b_j$ by a constant $a_{jk}$, where j is the row or element number in a column vector, and k is the index of the partial sum where $1 \leq k \leq n$. To this product, we must add either the cumulative sum of preceding products or, in the case of all rows of the partial matrix except the first, $b_j$ where j is the row number, $1<k \leq n$. In practice, $a_{11}b_1 + a_{12}b_2 + a_{13}b_3 \ldots + a_{1n}b_n$ is implemented as follows:

The element $b_1$ is fed to the multiplier 20 from the data memory 13 and serves as the first multiplier operand, Op A. The second multiplier operand, Op B, is the constant $a_{11}$ which the multiplier receives from the program memory 17. The product $a_{11}b_1$ is fed to the adder 24 and serves as the first adder operand Op A. For this first product, the sum in the accumulator is zero, which is fed to the adder via the third multiplexer 23 and serves as the second adder operand Op B. Consequently, the output of the adder 24 is $a_{11}b_1$ and is fed back to the accumulator 16, where it is stored.

The next element $b_2$ is now fed to the multiplier 20 from the data memory 13 and serves as the first multiplier operand, Op A. The second multiplier operand, Op B, is the constant $a_{12}$ which the multiplier receives from the program memory 17. The product $a_{12}b_2$ is fed to the adder 24 and serves as the first adder operand Op A. For this second product, the sum in the accumulator is now $a_{11}b_1$, which is fed to the adder via the third multiplexer 23 and serves as the second adder operand Op B. Consequently, the output of the adder 24 is $a_{11}b_1+a_{12}b_2$ and is fed back to the accumulator 16, where it is stored for the next iteration. This procedure is repeated for all elements, whereby the current sum stored in the accumulator 16 is successively added to the current product for the next element until all columns of the matrix are computed.

For all rows of the sparse matrix except the first, a similar procedure is adopted except that we add the element itself to the previously computed product. So, the sequence of operations for $a_{21}b_1+b_2$ is that element $b_1$ is fed as the first multiplier operand from the data memory 13 and the constant $a_{21}$ is fed as the second multiplier operand from the program memory 17. The product $a_{21}b_1$ is added to $b_2$, which was a priori placed in the accumulator, so that the result $a_{21}b_1+b_2$ is fed back to the accumulator 16.

The first multiplexer 21 receives selected data from the data memory 13, while the second multiplexer 22 can receive selected data either from the data memory 13 or a selected constant from the program memory 17 depending on a program instruction also stored in the program memory 17 (or in another memory). The third multiplexer 23 can receive a selected constant from the program memory 17 or an intermediate sum stored in the accumulator memory 16. Each clock we feed one element (out of 12) each of length 256 bits with its respective constant to the multiplier 20. The output from the adder 24 is fed to the accumulator memory 16 and, via a fourth multiplexer 25, also to the data memory 13, which stores the hash result.

It should be noted that each multiplexer has a single output, and as many inputs as there are alternative sources from which to select data plus one more input which is the select line. The select line simply selects which one of the inputs is going to the output at that specific clock, while any data on the remaining inputs are ignored. For example, referring to FIG. 2 the first multiplexer 21 has only two inputs to which are fed a selected element from the data memory 13 and the output from the multiplier 20. At each clock, the program memory directs the multiplexer which of these two inputs is to be routed to the output. The specific element that is selected from the data memory, or indeed from any other memory, is indicated by an address provided by the program memory. It follows from this that, in the arrangement of FIG. 2, selection of a specific element or constant is achieved by a combination of an addressable memory and a multiplexer.

However, those skilled in the art will realize that the desired selection can be made using different hardware. For example, also with reference to FIG. 2, the accumulator memory and the program memory could be realized by different partitions of a common memory module. The instruction set in the program memory will specify for each clock which address to read and which partition, thus accessing only a single data element, which can be fed directly to the adder 24 without the need for the third multiplexer 23. A similar approach can be adopted for selection of other data. Ultimately, regardless of how the memories are partitioned and what ancillary hardware is used to realize the selection of the required data, it is the instruction set in the program memory that contains the address for each selected constant, data element or sum that may serve as an input to the multiplier in a successive clock cycle. Only the product of the multiplier is not accessible from memory, although it could, albeit not ideally, be stored in memory and read out in a subsequent clock cycle. In any event, while this is required for computing exponents, the invention may also be used in applications where this is not required. Therefore, within the context of the description and the appended claims, the term "selector" should be understood as referring to the instruction set, which is pre-programmed for each application, in combination with supporting hardware that facilitates the required selection. When an addressable memory is used, the address defines a state of the selector in the sense that it indicates from which memory or partition to access the data. If an external multiplexer is used in combination with the memory, then the state of the selector will also define to which input the multiplexer select line refers. But if no external multiplexer is used, there must still be a multiplexer internal to the addressable memory. So regardless of the hardware configuration, each selector requires a multiplexer.

In a specific implementation of the invention reduced to practice, a two-port memory was used having two address inputs pointing to two corresponding data elements so that for every clock, two different addresses can point to different data, allowing two different elements to be accessed simultaneously for each clock. In one implementation of the invention, this feature was used to write or update one element while reading another. To avoid obscuring the drawings, the address lines provided by the program that inform the memory which entries to read are not shown. For the same reason, the clock inputs to the memories and the multiplexers not shown.

For the full Poseidon process there are only three primitives that we need to execute, namely:

1. $newX_i = oldX_i^5 + \text{constant}$

2. $newX_i = \sum(oldX_j \times \text{constant})$

3. $newX_i = (oldX_0 \times \text{constant}) + oldX_i$

Examples of how these three primitives are executed using the processor 12 will now be described.

First primitive: $newX_i = oldX_i^5 + \text{constant}$

Figure 1A:
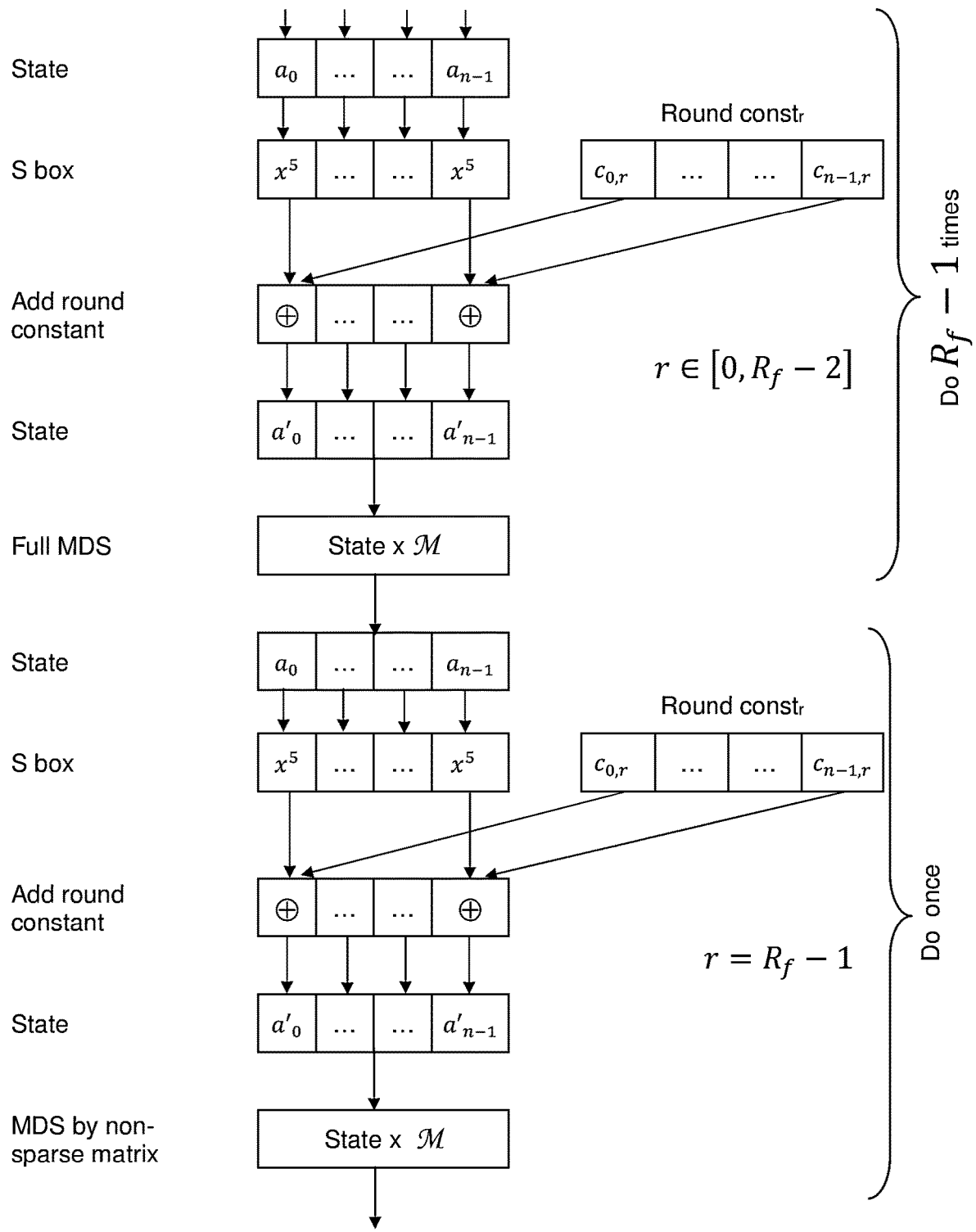
FIGS. 1a to 1c show subsequent stages in the execution of the prior art optimized Poseidon hash function.
Figure 5A:
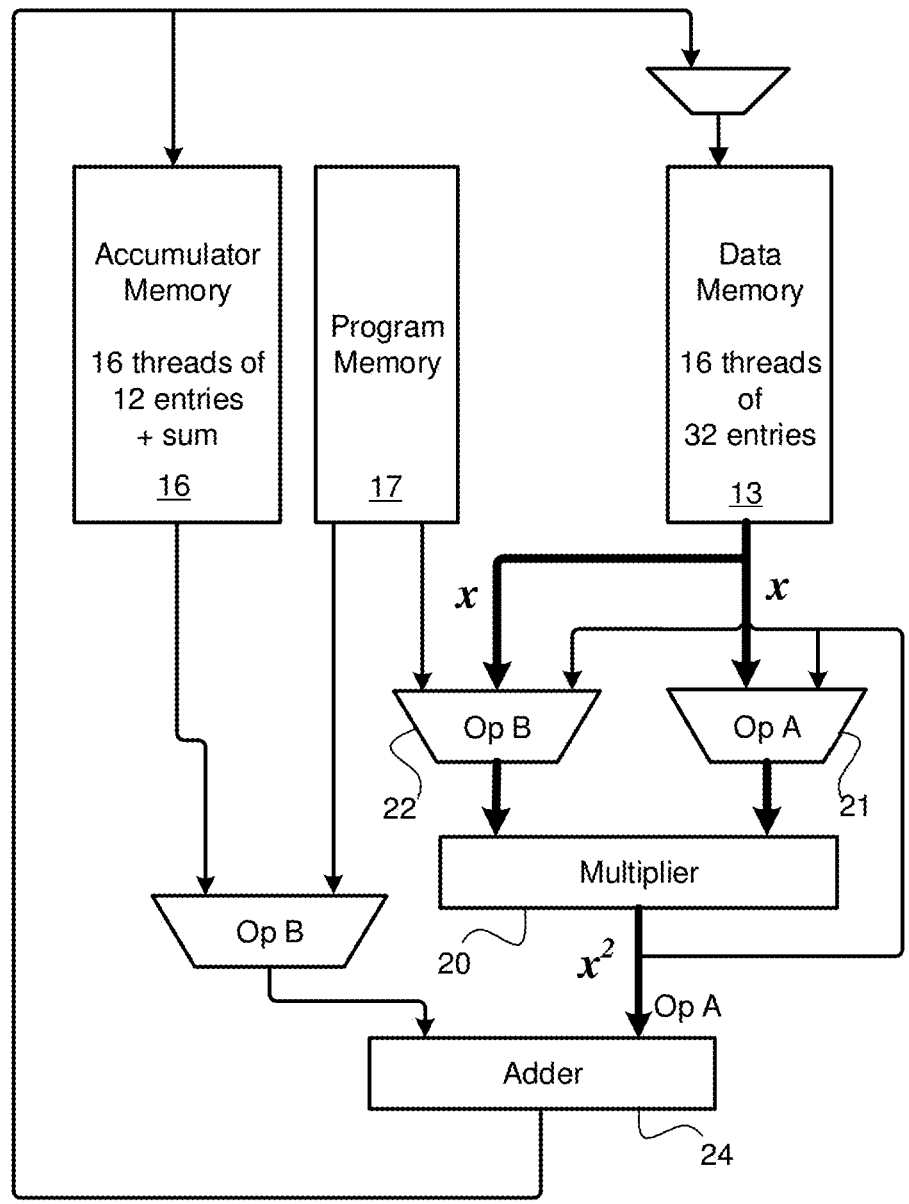
FIGS. 5a, 5b and 5c show a partial detail of the processor in which selected memory address paths are highlighted during successive stages of a first primitive associated with the Poseidon function.
Figure 5B:
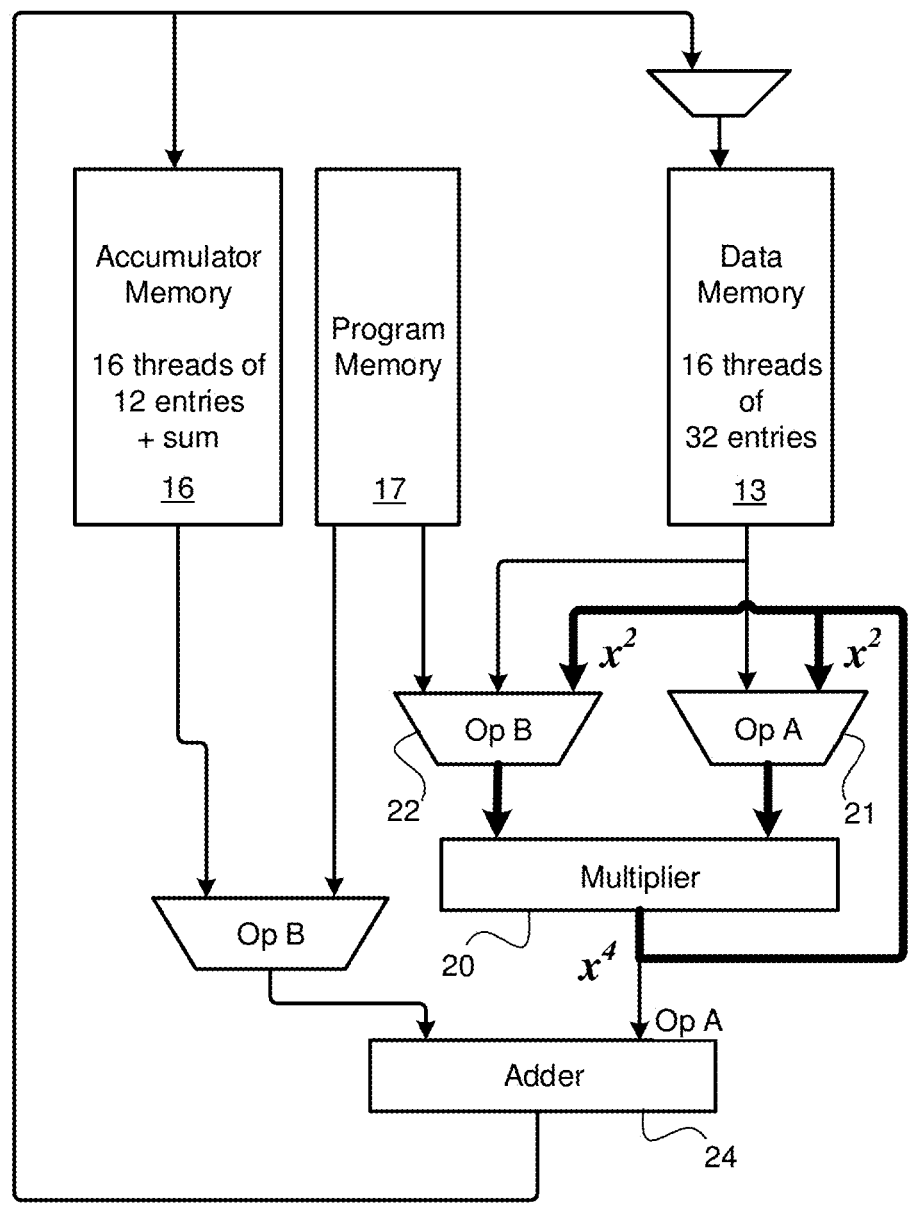
Figure 5C:
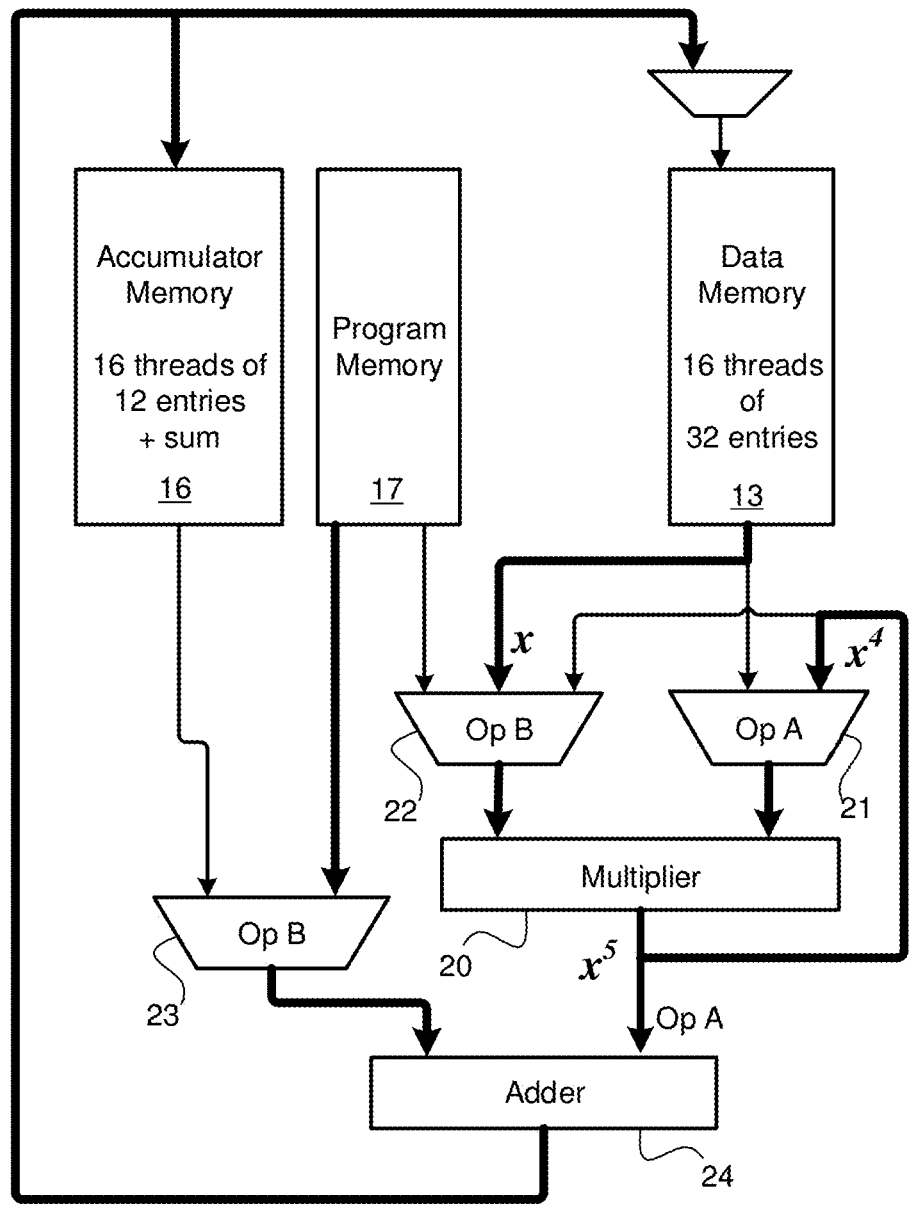

The first primitive is used in the first stage of the Poseidon hash function as shown in FIG. 1a, wherein each element (x) is raised to the exponent five and in the Filecoin application, a constant ($c_{n,r}$) is added to each resultant power ($x^5$). Implementation will be described with reference to FIGS. 5a, 5b and 5c, showing a partial detail of the processor wherein selected memory address paths are highlighted using thick lines to show the flow of data. Throughout the following description, it is assumed, by way of example only, that all the constants are stored in the program memory 17.

FIG. 5a shows the first stage wherein an element x in the data memory 13 is routed to the selected inputs of both the first and second multiplexers 21 and 22 to serve as the first and second operands Op A and Op B to the multiplier 20. The result from the multiplier 20 is therefore equal to $x^2$. In a subsequent stage shown in FIG. 5b, when the multiplier has completed the computation, the output $x^2$ from the multiplier 20 is recycled to the selected inputs of both the first and second multiplexers 21 and 22 to serve as the first and second operands Op A and Op B to the multiplier 20. The result from the multiplier 20 is therefore equal to $x^4$. In a subsequent stage shown in FIG. 5c, the output $x^4$ from the multiplier 20 is recycled to the selected input of either the first and second multiplexer 21 and 22 while the selected element x in the data memory 13 is routed to the selected input of the other multiplexer. The result from the multiplier 20 is now equal to $x^5$. In the final stage also shown in FIG. 5c, the output of the multiplier 20 serves as the first operand Op A to the multiplier 20 and an adder constant is routed to the selected input of the third multiplexer 23 from the program memory 17 and added to the output of the multiplier 20. The result from the multiplier 20 is now equal to $x^5$+constant, which is routed back to the accumulator 16 where it is stored.

Second primitive: $newX_i = \sum(oldX_j \times \text{constant})$

Figure 6:
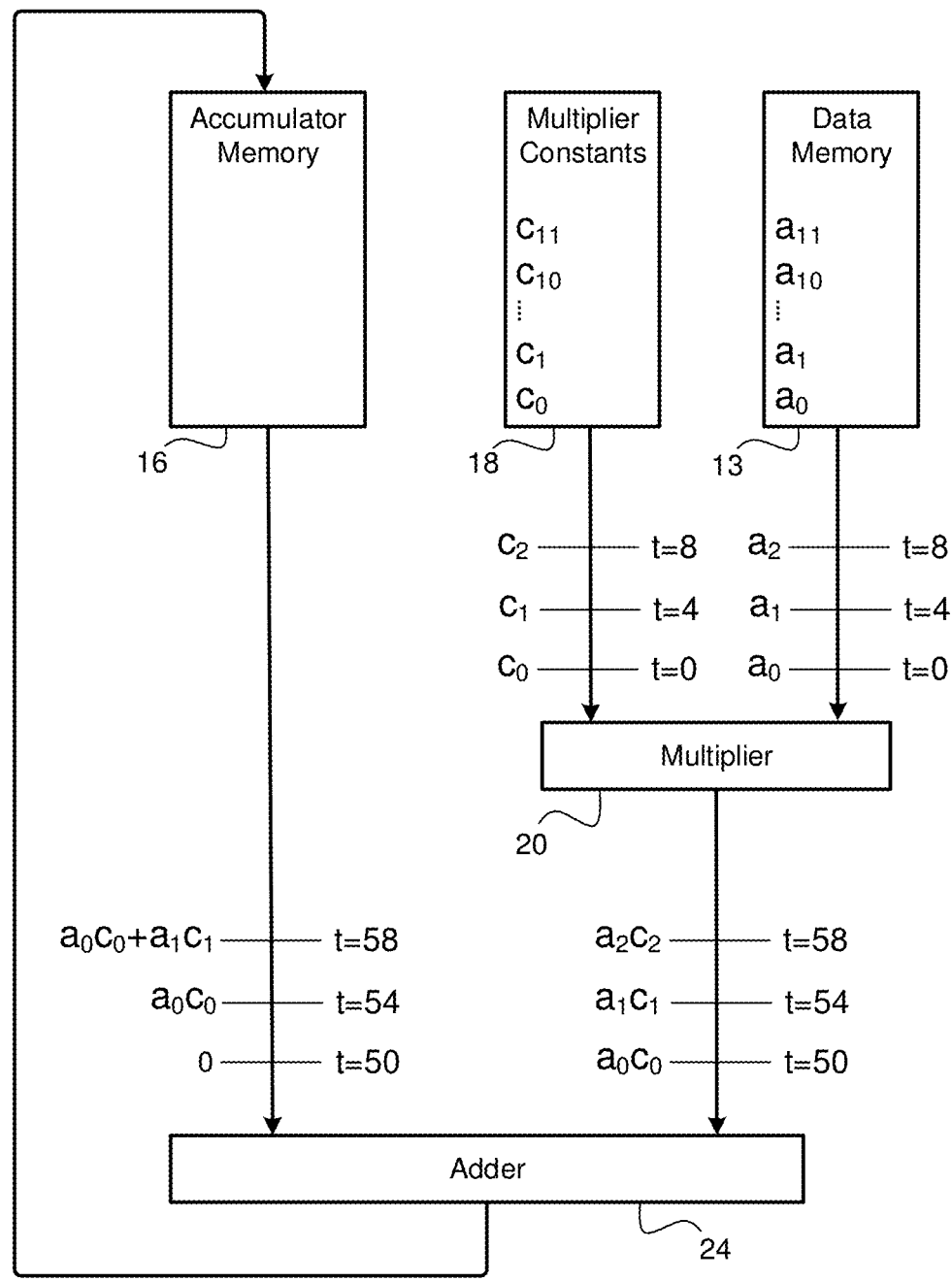
FIG. 6 shows the states of the multiplier and adder after specified clock intervals during successive stages of a second primitive associated with the Poseidon function.

The second primitive is used in the second stage of the Poseidon hash function also shown in FIG. 1a, wherein each state (a'$_0$), derived as explained above, is multiplied by a full matrix $\mathcal{M}$. We have already described how this is done with particular reference to the accumulator memory, but we now describe a partial implementation with reference to FIG. 6, showing the state of the multiplier and adder after successive clock intervals. At time t=0, an element $a_0$ and a multiplier constant $c_0$ are selected from their respective memories and fed to the multiplier. It takes at least 32 clock cycles for the multiplier to output a result, but for the sake of illustration we shall assume that each multiplication requires 50 clock cycles. This will leave some contingency and, as we shall see later, any idle time when any given thread is waiting for an operation to complete is taken up by a different thread. The next element $a_1$ and the next multiplier constant $c_1$ are not fed to the multiplier at time t=1 i.e., the next clock cycle, but rather after a delay of four clock cycles, i.e., at time t=4. The reason for this is that it takes approximately four clock cycles for the adder to complete its operation and feed the result to the accumulator memory; and this result must be fed back to the adder in synchronism with the product of the next multiplication. Thus, as can be seen in the figure, $a_1$ and $c_1$ are fed to the multiplier at time t=4, and $a_2$ and $c_2$ are fed to the multiplier at time t=8, etc. Since each multiplication takes 50 clock cycles, we see in FIG. 6 that at time t=50, the product $a_0c_0$ is now computed and is available at the output of the multiplier from where it is fed as the first operand to the adder. The second operand is obtained from the accumulator memory in accordance with a predetermined sequence in the program memory, which is not shown in FIG. 6 but which orchestrates the timing and selection of elements and constants for feeding to the multiplier and adder. For the first element, the second operand is set to zero, so that the sum at the output of the adder remains $a_0c_0$. This is fed back to the accumulator memory from where it is routed back to the adder. The time for the adder to perform the addition, to feed the sum to the accumulator memory and for the accumulator memory to route the sum back to the adder takes approximately four clock cycles. Therefore, at time t=54, the product $a_0c_0$ is fed as the second operand to the adder. At the same time t=54, the multiplier will have computed the product $a_1c_1$ from the second element and the second constant that were entered into the multiplier at time t=4. Consequently, at time t=54, the two adder operands are $a_0c_0$ and $a_1c_1$, such that after a further four clock cycles the sum $a_0c_0+a_1c_1$ will be fed as the second operand to the adder at the same time (t=58) that the next product $a_2c_2$ is computed and fed as the first operand to the adder. The new sum $a_0c_0+a_1c_1+a_2c_2$ is available after a further four clock cycles at time t=62 and the cycle is repeated as required.

Third primitive: $newX_i = (oldX_0 \times \text{constant}) + oldX_i$

Figure 1B:
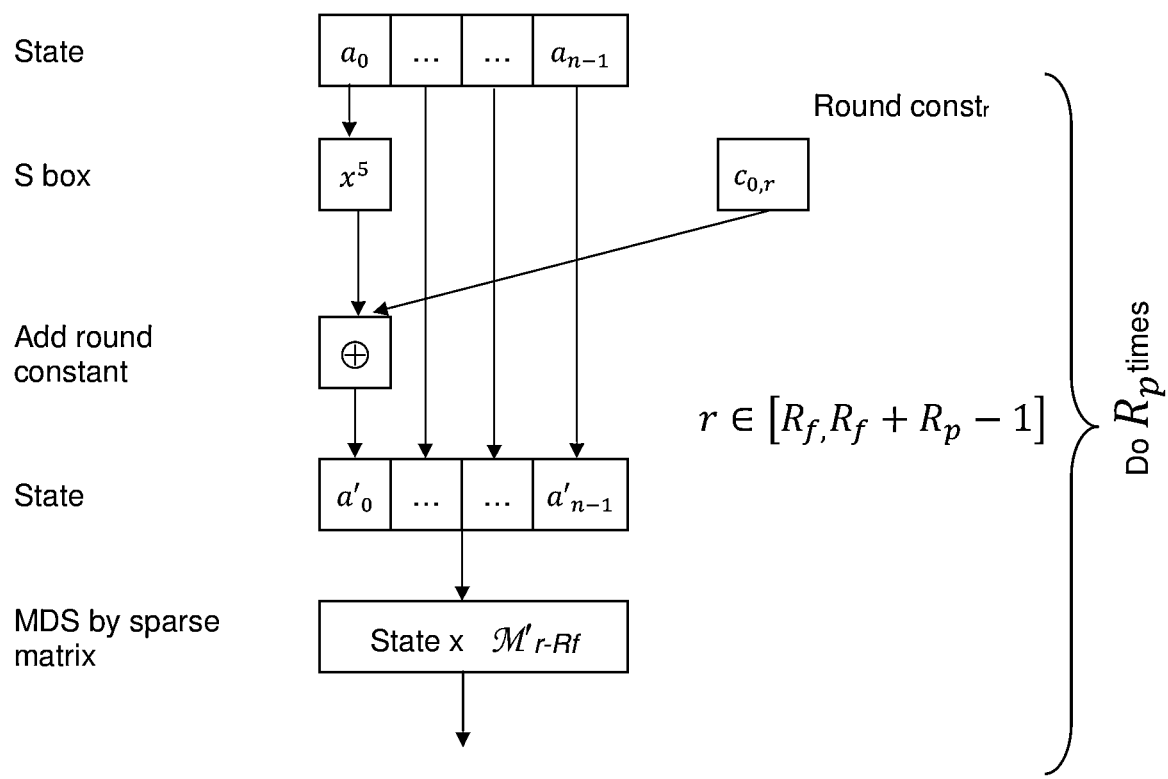

The third primitive is used in the third stage of the Poseidon hash function, wherein each state (a'$_0$) is multiplied by a sparse matrix $\mathcal{M}'$ as shown in FIG. 1*b*. The first row of the sparse matrix product is $a_{11}b_1+a_{12}b_2+\ldots a_{1n}b_n$, which is implemented using the second primitive. All subsequent rows are derived using the third primitive, which is actually a modified version of the second primitive and so need not be described in detail. Implementation of the third primitive requires that each element $b_n$ for n>1 that is written to the data memory 13, be written also to the accumulator memory 16, from which it can then be routed to the adder together with the product of $a_{j1}b_1$, for 1<j≤n, where n is the number of elements being hashed. The timing is similar to that described above with reference to FIG. 6, the main difference being that the accumulator memory feeds selected elements to the adder as distinct from the cumulative sum of products as is done in the second primitive. Another difference is that only a single sum is required as distinct from the multiple recursions of the second primitive. A third difference, as already noted, is that elements must be written to the accumulator memory as well as to the data memory.

Figure 1C:
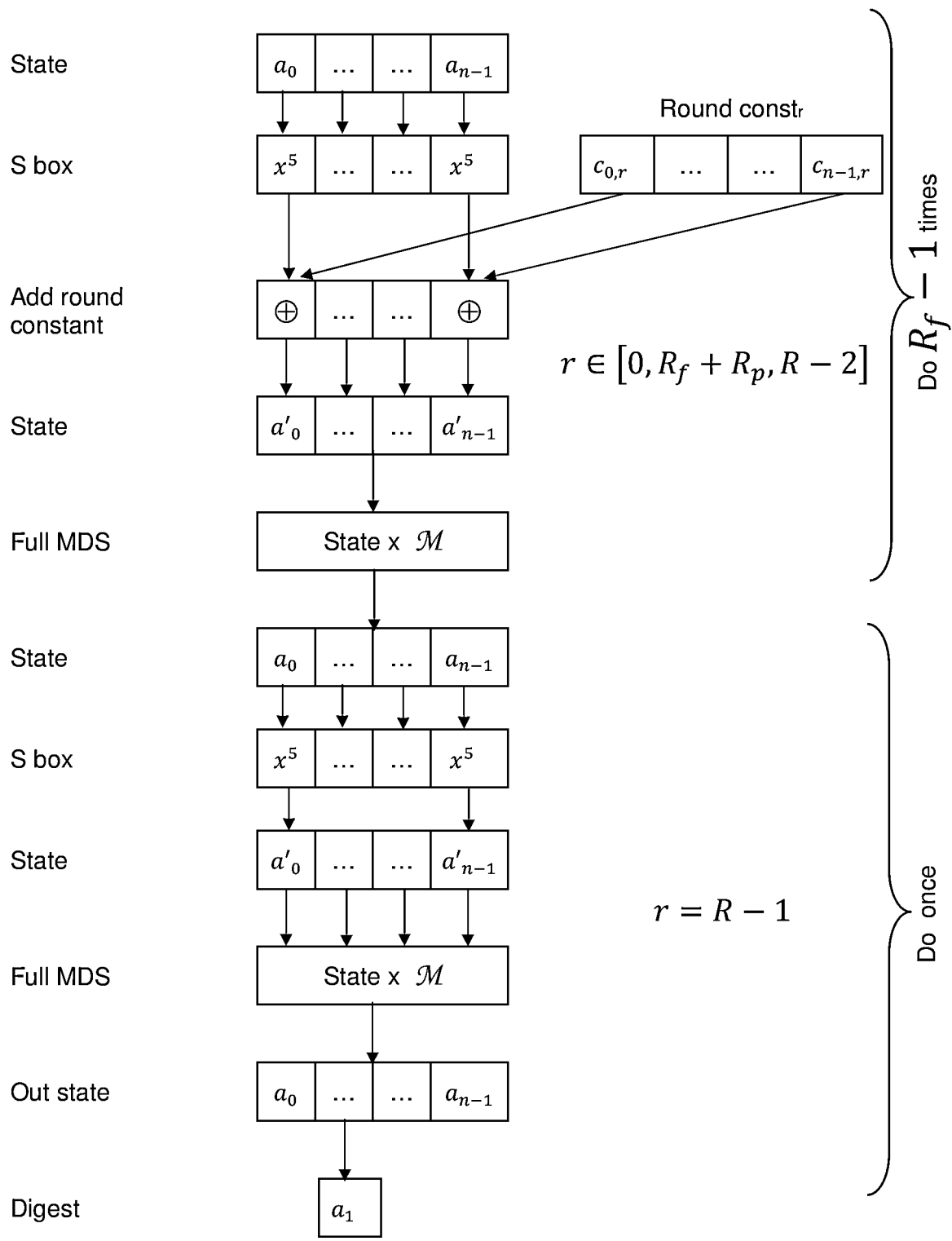

It thus emerges that the logic shown in FIGS. 1*a* to 1*c* can be fully implemented by executing the three primitives as appropriate. The resultant hash function computed by any single processor 12 is stored in the respective data memory 13 of the same processor and conveyed to the data memory of another processor in the same or a different core by a ring node 30, which is part of a ring 31 shown in more detail in FIG. 8. The ring node 30 includes a sixth multiplexer 32, which conveys the result from all four processors in each core to either an Input FIFO 33 or, via a seventh multiplexer 34, to corresponding ring nodes associated with other Poseidon cores. The hash result is stored in a register 35, which retains its value prior to routing to the FIFO 33 or to a different core, which may not be ready to process it. Depending on its ID, the hash result may need to be routed to the same processor or to a different processor in the same core, in which case it is routed to the FIFO 33, which is also a register that retains the hash result until the designated processor is ready to accept it. Based on the ID of the hash result in the data memory 13, the sixth multiplexer 32 and the FIFO 33 select one of the four processors 12 in the core 11 to feed the hash result to the same or a different processor in the same core 11 via the FIFO 33 or, via the seventh multiplexer 34, to adjacent cores. The manner in which this is done will be explained below.

The multiplier 20 and the adder 24 in each core 11 operate in pipeline mode so that all multiplications and additions are carried out in parallel. Approximately, 3,000 ops are required to complete the Poseidon-12 hash function. As noted above, it takes approximately 32 clock cycles for the multiplier 20 to output a result. For each successive clock, one element can be fed to the multiplier, so that it requires twelve clock cycles to feed all twelve elements to the multiplier for the first primitive. Therefore, the results of twelve multiplications will be obtained only after in excess of 80 clock cycles, more precisely (32+12×ADDER_DELAY). As explained above with reference to FIG. 6, the ADDER_DELAY is necessary to ensure that the adder receives both operands in synchronism, i.e., the output from the multiplier 20 and either the requisite constant from the program memory or the result of an earlier computation from the accumulator memory. In other words, after twelve clocks, all twelve elements will have been input to the multiplier and only after a further twenty clock cycles will the result of the first multiplication be ready to feed back to the multiplier. This means that there is significant idle time. The same is true for the second primitive where we need to feed successive elements to the multiplier at intervals of four clock cycles. We could allow the processor to remain idle and to perform all the necessary calculations serially, but this is clearly time-consuming and highly inefficient. In practice, the data memory 13 stores respective elements for multiple hashes and the scheduler 15 controls which of the elements and constants are fed to the multiplier and to the adder so as to allow sixteen threads to be processed in parallel. The scheduler 15 stores a program that determines whether to write the result to the accumulator memory 16 and/or to the data memory 13 via the fourth multiplexer 25 and, if so, to which memory address.

In principle, if only one 12-word string requires hashing, a single processor would suffice without the need for additional processors in the core and without the need for additional cores. In practice, of course, there is a need to hash much longer strings than 3,072 bits (12×256). It is therefore known when implementing hash functions using software to employ a Merkle tree, the idea behind which is that the input string is split into manageable chunks each of which is of a size suitable for hashing, so that hashing each chunk produces respective hashes of reduced size. The hashes are then arranged in groups, each of which is hashed to form progressively fewer hashes until eventually only a single hash remains. It is not efficient to perform these operations sequentially, and significant improvement in performance can be achieved by parallel processing whereby intermediate groups are hashed in parallel by different Poseidon processors.

At its most basic, a multi-core processor could have only a single processor in each core. But in practice this is less than optimal because, as described above, each core requires a ring node, which includes two multiplexers and a FIFO register and it is not efficient to replicate these components for only a single processor in each core since a system having 32 processors would require 32 ring nodes. It has been found that a ring having eight ring nodes serving eight cores each having four processors provides a good trade-off between speed and cost, although other configurations that allocate fewer cores each having more processors or vice versa are also feasible. It will, of course, be understood that the system is not constructed from discrete components (although it could be) but is preferably fabricated as an integrated circuit. Thus, cost is more a measure of real estate i.e., the size of the wafer rather than the number of circuit components since the fewer components required, the less silicon is required to fabricate the circuit, the lower will be required power giving rise to reduced heat, and so on. It is of course also true that a 32-core system having only one processor in each core will take longer to convey data from the first core in the ring to the last, than would an 8-core system having four processors per core.

Figure 7:
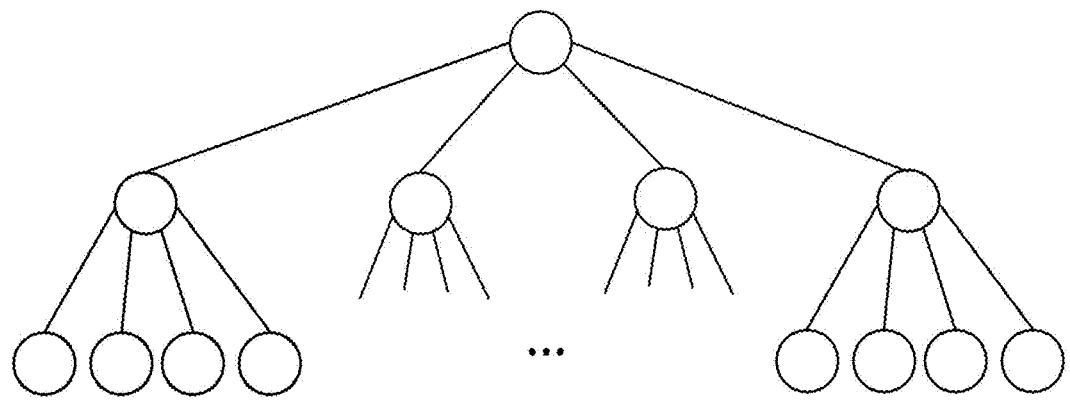
FIG. 7 represents a Merkle tree with arity 4.

A Merkle tree is a hash-based data structure that is a generalization of the hash list. It is a tree structure in which each leaf node is a hash of a block of data, and each non-leaf node is a hash of its children. Merkle trees have a branching factor or arity k, meaning that each node has up to k children. Merkle trees are typically implemented as binary trees which have arity of 2, in which case for N nodes, the depth of the tree is $\log_2 N$. In general, a Merkle tree can be created as an k-nary tree, with k children per node. As an example, FIG. 7 represents a Merkle tree with arity 4, although in the implementation described below a Merkle tree with arity 8 is employed. For a k-nary tree, with N nodes the depth is given by $\log_k(N)$.

In an embodiment of the invention, although the first hash is performed using Poseidon-12, thus requiring that twelve input strings be reduced to a single 256-bit word, subsequent hashes are performed using Poseidon-9. In practice, the Poseidon protocol as implemented by Filecoin requires that, for each hash, one of the elements be a constant. Therefore, Poseidon-12 actually reduces 11 words plus a constant to 1 word, while Poseidon-9 reduces 8 words plus a constant to 1 word. Since our interest is ultimately to reduce a multi-word string to a single word, we refer always to the actual number of words in the input string that are hashed at any one time. In this context, it will therefore be understood that, when used to implement Filecoin, Poseidon-12 hashes eleven elements of the input string to a single element; and Poseidon-9 hashes eight elements to a single element. This being said, it will be understood that the application of the invention for hardware implementation of Filecoin is by way of non-limiting example. More generally, the elements that are hashed by Poseidon are all variable data elements and the invention encompasses both scenarios.

The implementation is essentially the same as described above with reference to FIGS. 1*a* to 1*c* of the drawings, except that it operates on only eight input strings rather than eleven (each plus a constant). When using Poseidon-9 to compute the intermediate hashes rather than Poseidon-12, there is the advantage that it takes less time to obtain the resulting hash since it operates on fewer elements. Moreover, we cannot perform subsequent hashes until eight initial hashes are completed, since we require the results of eight hash functions together with an additional constant to serve as input to the next stage. Of course, if we used Poseidon-3, the intermediate hashes would be computed even faster, but this would come at the price that overall, more intermediate hashes would be necessary. The use of Poseidon-12 for the first stage following by Poseidon-9 for each successive stage has been found to be a reasonable compromise resulting in good performance.

This can best be demonstrated by a practical example where we have 11G input strings each of 256-bit words. Each input string is given a respective Hash ID. Each Poseidon core has four processors and there are eight cores, so there are 32 processors in total, each having a respective ID from 0 to 31. The host computer feeds the input strings to respective Poseidon cores. In the implementation shown in the figure, we have elected to arrange the 32 processors between 8 cores (of which only one is shown) each having four processors. But this is merely a design choice as long as there are 32 processors in total each having a different ID.

For the first layer (Layer 0), the 5 least significant bits of each Hash ID point to the processor to which this string must be fed. The result of this hash is a single 256-bit word, which will be hashed with the results of other processors in the second layer (Layer 1). The first layer (Layer 0) reduces 11G words to 1G words i.e., $2^{30}$ words each having 256 bits. All subsequent hashes use Poseidon-9, which reduces an 8-word string each of 256 bits (plus a constant) to a single 256-bit word, i.e., the reduction is by a factor of 8. Since for all subsequent hashes we reduce the length by a factor of 8 ($2^3$), we can reduce an input string having 30 words to a single word in 11 stages, i.e.

Layer 0: $2^{30}$ words
Layer 1: $2^{27}$ hashes
Layer 2: $2^{24}$ hashes
Layer 3: $2^{21}$ hashes
Layer 4: $2^{18}$ hashes
Layer 5: $2^{15}$ hashes
Layer 6: $2^{12}$ hashes
Layer 7: $2^9$ hashes
Layer 8: $2^6$ hashes
Layer 9: $2^3$ hashes
Layer 10: Final result The hash result for each processor must be given an ID which identifies the hash and the word (i.e., element). The Hash ID of the result is the original Hash ID/8 and the ID of the word or element is the original element ID Mod 8. The reason why modulo 8 is chosen is because after the first layer (layer 0), all subsequent hashes are applied to eight elements (plus a constant) using Poseidon-9. It follows that in an application not related to Filecoin where Poseidon-9 is used to hash nine elements at a time in the input string, the Hash ID of the hash result would be the original Hash ID/9 and the ID of the word or element would be the original Hash ID Mod 9. This will mean that the Hash ID is incremented by one for every nine elements in the input string. More generally, if $\lambda$ elements are hashed using a suitable hash function (not necessary Poseidon), the Hash ID of the result is the original Hash ID/$\lambda$ and the ID of the word or element is the original element ID Mod $\lambda$. For the sake of abundant clarity, it will be appreciated that the hash results for each layer serve as elements for the next layer. The result of hashing multiple elements is dependent on the order in which they are processed, so it is crucial that we are able to identify not only which hash results need to be hashed by each processor, but also and no less importantly, the order in which they appear.

It would be possible to bypass the need to identify the elements in the first layer, i.e., layer 0 since we could feed the elements to successive processors and cores in sequence. Each successive processor 12 in each successive core 11 would receive eleven elements from the Host IF 43 and would generate a respective hash. The hashes from multiple processors in the same or different cores must now be hashed in batches of 8. Since these hashes, which constitute elements for layer 1 (and higher), are generated by different processors, there is clearly no guarantee that they will be generated in the correct sequence for passing to the next higher layer of the Merkle tree. Therefore, these elements (i.e., the hash results of the immediately lower layer) must be identified so that they can be processed in the correct sequence. In practice, it simplifies matters if all elements are identified in correct running order, including the elements of layer 0, since the same operations can then be applied to each layer of the Merkle tree.

By way of example:

0000 ... 0000000 =>Hash $ID = 0$; element $ID = 0$

0000 ... 0000001 =>Hash $ID = 0$; element $ID = 1$

0000 ... 0000010 =>Hash $ID = 0$; element $ID = 2$

...

0000 ... 0000110 =>Hash $ID = 0$; element $ID = 6$

0000 ... 0000111 =>Hash $ID = 0$; element $ID = 7$

0000 ... 0001000 =>Hash $ID = 1$; element $ID = 0$

0000 ... 0001001 =>Hash $ID = 1$; element $ID = 1$

Each element having the same Hash ID is sent to the same processor and elements having different Hash IDs are sent to different processors. Each processor can handle 16 threads so we can processor 32×16=512 threads at any one time. When each thread is complete, the scheduler can route other elements to the processor according to the element ID, it being understood that after the first layer, all elements are hash results of the immediately lower layer.

Figure 8:
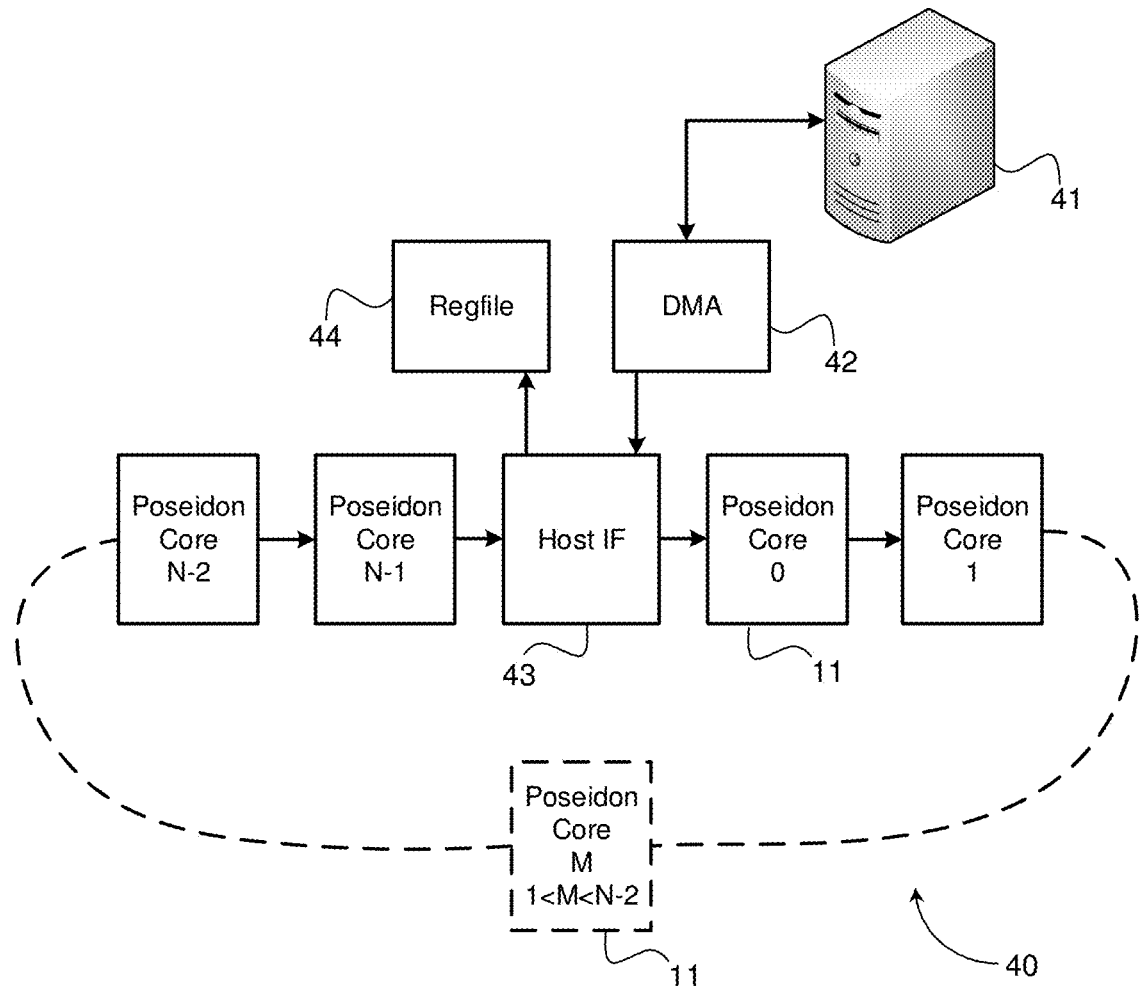
FIG. 8 is a block diagram showing the functionality of a multi-processor system using the hardware accelerator shown in FIG. 2.

FIG. 8 shows a detail of the ring 31 in the context of a system 40 comprising a computer 41, which stores in its system memory the elements and constants that source the data memory 13 and the program memory 16 shown in FIG. 2. A direct memory access (DMA) 42 allows a host interface 43 to access the system memory of the computer 41 independently of its central processing unit. A regfile 44 enables debug capabilities and provides information about the status of the system during the process. The host interface 43 configures the data accessed from the computer 41 for use with the hash processor 12 described above with reference to FIG. 2. Thus, in the specific implementation of the invention as described, each element or word is 256-bits long. Typically, the computer 41 is a PC having a 64-bit operating system, wherein the stored data are only 64 bits long, thus requiring that four elements extracted from the system memory of the computer 41 be concatenated prior to relaying to the data memory 13 and the program memory 16. The host interface 43 also assigns an Element ID to each element in sequential order and a Hash ID is likewise assigned to each element, so that all elements and hashes are directed to the correct core 11 and constituent processor 12 in the correct sequence. To this end, the host interface 43 is connected in series with the ring 31 and conveys the requisite data through the ring, where it is either passed on by the seventh multiplexer 34 in each ring to an adjacent ring or is stored in the FIFO 33 of the destination ring, depending on the ID of the data. As noted above, it is not absolutely necessary to allocate an Element ID to each element received from the system memory of the computer 41, since they can be accessed and fed to the processors in the correct sequence. But it is convenient to adopt a consistent approach for all layers.

Figure 9A:
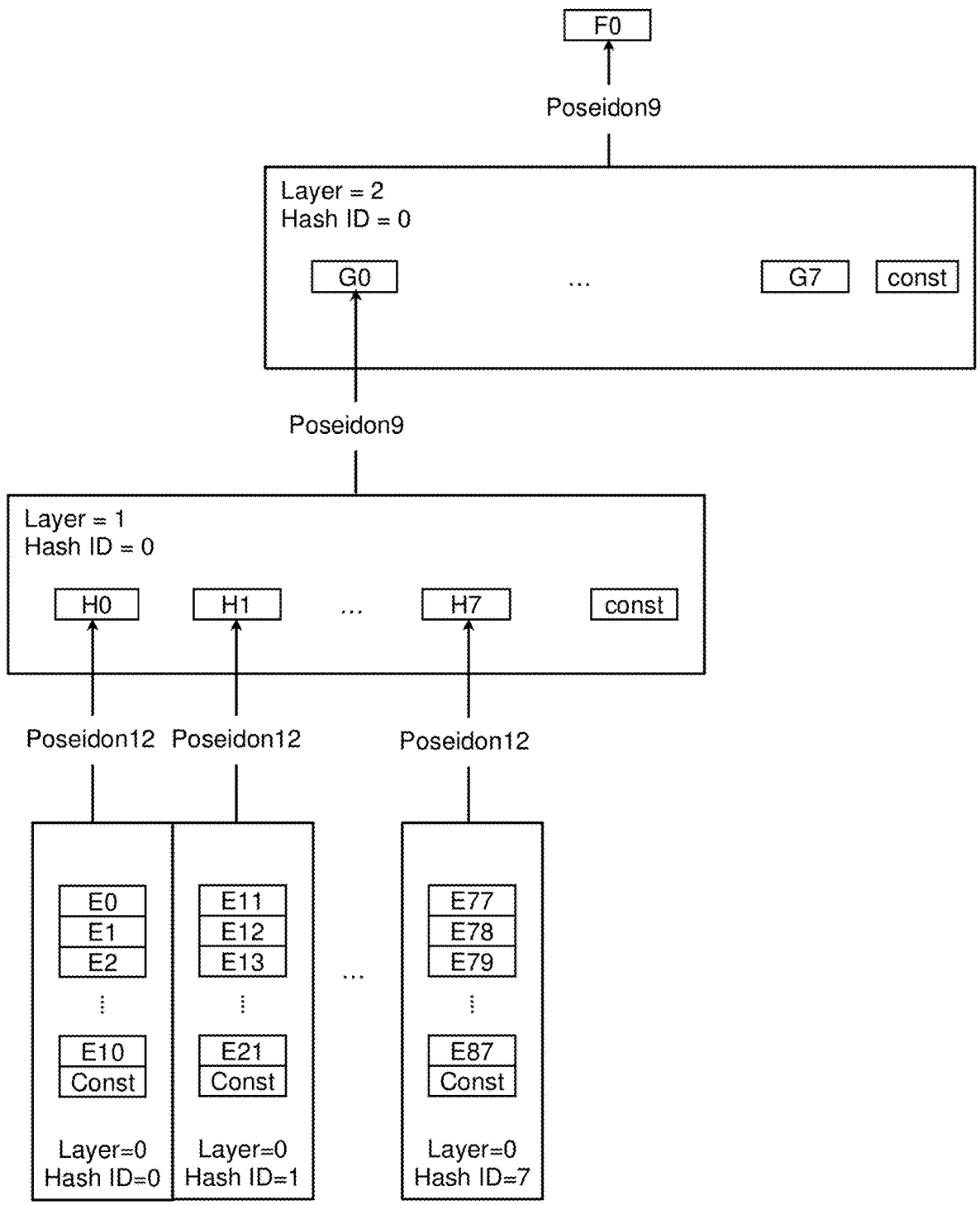
FIGS. 9a and 9b show schematically a simplified implementation of a Merkle tree using the system of FIG. 8.
Figure 9B:
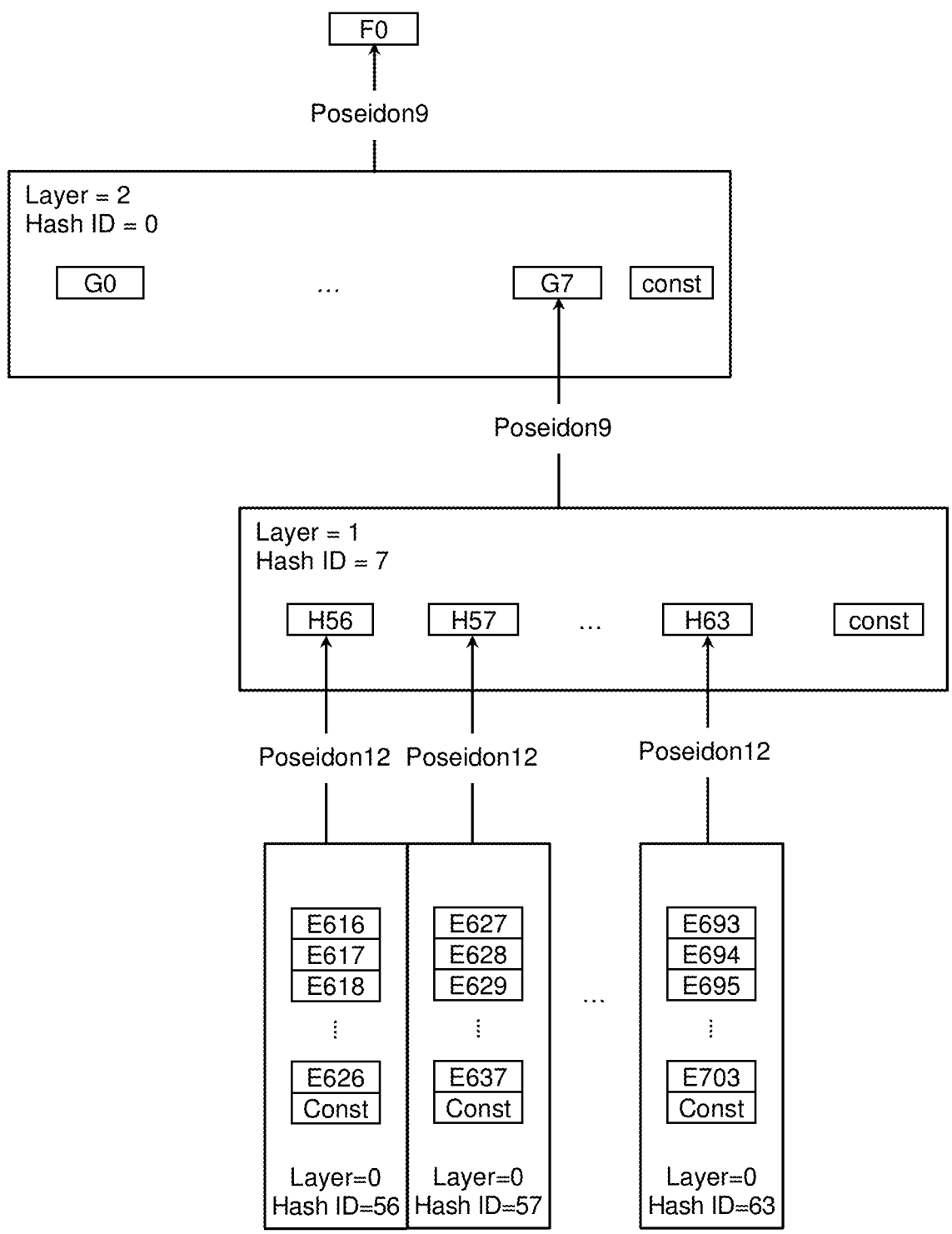

FIGS. 9a and 9b show schematically a partial simplified implementation of a Merkle tree using the system of FIG. 8. For ease and brevity of explanation, we consider a hypothetical case where the system 40 is used to hash only 704 elements using a Merkle tree with a depth of 2. Consequently, the final hash result is implemented in three layers as follows:

First Layer (Layer 0):

Since 704=11×64, the first layer of the Merkle tree will perform 64 hashes using Poseidon-12 as follows:
 Elements E0-E10 together with a constant are hashed using Poseidon-12 into H0.
 Elements E11-E21 together with a constant are hashed using Poseidon-12 into H1.
 This is repeated for successive groups of eleven elements until elements E693-E793 together with a constant are hashed using Poseidon-12 into H63.

Second Layer (Layer 1):

Since 64=8×8, the second layer of the Merkle tree will perform 8 hashes using Poseidon-9 as follows:
 Elements H0-H7 together with a constant are hashed using Poseidon-9 into G0.
 Elements H8-H15 together with a constant are hashed using Poseidon-9 into G1.

This is repeated for successive groups of eight elements until elements H56-H63 together with a constant are hashed using Poseidon-9 into G7.

Third Layer (Layer 2):

On the third and last layer of the Merkle tree the result of layer 2 are hashed as follows:
 Elements G0-G7 together with a constant are hashed using Poseidon-9 into the final result which is F0.

To execute the above procedure, we will assume that there are eight cores with four processors in each core. Since there are 32 processors in total, and the first layer requires 64 hashes, this means that for the first layer each processor must execute two threads simultaneously to allow for parallel processing. The elements enter the system one after the other and each consecutive eleven elements are associated with a consecutive Hash-ID and Layer=0 and routed as follows.

Layer 0, Hash-ID 0 sent to Core 0, processor 0, thread 0.
 Layer 0, Hash-ID 1 sent to Core 0, processor 1, thread 0.
 Layer 0, Hash-ID 2 sent to Core 0, processor 2, thread 0.
 Layer 0, Hash-ID 3 sent to Core 0, processor 3, thread 0.
 Layer 0, Hash-ID 4 sent to Core 1, processor 0, thread 0.
 Layer 0, Hash-ID 5 sent to Core 1, processor 1, thread 0.
 . . .
 Layer 0, Hash-ID 30 sent to Core 7, processor 2, thread 0.
 Layer 0, Hash-ID 31 sent to Core 7, processor 3, thread 0.
 Layer 0, Hash-ID 32 sent to Core 0, processor 0, thread 1.
 Layer 0, Hash-ID 33 sent to Core 0, processor 1, thread 1.
 . . .
 Layer 0, Hash-ID 63 sent to Core 7, processor 3, thread 1.

For the sake of abundant clarity, it is noted that elements E0-E10 are hashed in Core 0, processor 0, thread 0, the result being Hash-ID H0; elements E11-E21 are hashed in Core 0, processor 1, thread 0, the result being Hash-ID H1, and so on. Each processor serves its two threads and completes processing in an asynchronous manner. The results are sent to the ring for conveying to the designated processor that will process layer 1 hashes.

Layer 1, Hash-ID 0 sent to Core 0, processor 0, thread 2.
 Layer 1, Hash-ID 1 sent to Core 0, processor 1, thread 2.
 Layer 1, Hash-ID 2 sent to Core 0, processor 2, thread 2.
 Layer 1, Hash-ID 3 sent to Core 0, processor 3, thread 2.
 Layer 1, Hash-ID 4 sent to Core 1, processor 0, thread 2.
 Layer 1, Hash-ID 5 sent to Core 1, processor 1, thread 2.
 Layer 1, Hash-ID 6 sent to Core 1, processor 2, thread 2.
 Layer 1, Hash-ID 7 sent to Core 1, processor 3, thread 2.

Again, each processor processes this thread in an asynchronous manner and sends the result to Core 0, processor 0, thread 3 to process Layer 2, Hash-ID 0 which is the final result.

Each processor operates in accordance with an instruction set stored in the program memory. The instruction set is written in assembly language and in one implementation includes instructions to carry out the following operations. The number of bits allocated for each instruction is shown in parenthesis:

| Instruction | Brief description |
| --- | --- |
| Data-Select (5b) | The address of the element inside the thread namespace to read. Each thread has 32 entries in the data memory and accumulator memory. This address |

| Instruction | Brief description |
| --- | --- |
| | is for the data inside those entries that are relevant for this thread only |
| Mult-OpB-select (1b)<br>0: Data<br>1: Const | Indicates whether the second multiplier operand (Op B) is an element to be read from the data memory or a constant |
| ReMultiply (1b) | If set to 0, the first multiplier operand (Op A) is an element to be read from the data memory;<br>If set to 1, send the multiplier output back to input according to the following pattern:<br>Mult-OpA: Data→Recycle→Recycle.<br>On first access, data is selected from the data memory; on second and third accesses from the recycle line. Ignore if ReMultiply is 0.<br>Mult-OpB: Data→Recycle→Data.<br>On first access, data is selected from the data memory; on second access from the recycle line; and on third access from the data memory. Ignore if ReMultiply is 0 |
| Adder-OpB-select (1b)<br>0: Data<br>1: Const | Indicates whether the second adder operand (Op B) is data to be read from the data memory or a constant |
| Adder-Const-Memory-Address (9b) | The address of the adder constant in the constant memory partition |
| Write back data memory (1b) | If set to 1, write back result to data memory |
| Write back ACC memory (1b) | If set to 1, write back result to accumulator memory |
| Write back address (5b) | Address in thread namespace to write back result. Each thread obviously requires its own area of memory in which data must be stored. This area constitutes the thread namespace. |
| Wait-completion (1b) | If set to 1, wait for the previous instruction to complete before executing the next instruction |
| Wait-adder (1b) | If set to 1, wait 4 clocks before executing the next instruction |
| Last-Instruction (1b) | If set to 1, this is the last instruction to execute |

The program memory stores the instructions as a table wherein each row identifies the data addresses and logic flags pertaining to a single clock, and the instructions are executed line by line for each thread. For the Poseidon hash function described in FIGS. 1a to 1c, there are thousands of lines of code, each defining the sequence of events to be executed for each multiplication and addition. The processor reads the instructions cyclically, running through the whole cycle for each thread until the last instruction is reached. The data corresponding to the hash result for this thread is then written back to the specified address in the data memory and serves to feed another thread based on its ID as described previously, this whole process being executed asynchronously by all processors until the last instruction for all processors is reached.

While the invention has been described with reference to a specific dialect of the Poseidon hash function, it is noted that the invention resides principally in the provision of hardware that is configured to execute an algebraic function requiring modular multiplications and additions only. Therefore, similar hardware and logic could be used for fast matrix multiplication requiring repeated modular multiplication and addition, corresponding to what has been described above as the second primitive. But it could, of course, equally well find application for fast hardware implementation of the first or third primitive.

In particular it should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

For the sake of abundant caution, the invention encompasses the following inventive concepts:

Inventive Concept 1:

A multi-thread processor for computing a function requiring only modular multiplications and modular additions, the processor comprising:

a constants memory for storing a plurality of constants, a data memory for storing a plurality of multi-bit elements, a multiplier having a pair of inputs each for receiving respective first and second multiplier operands and producing a product of the first and second multiplier operands at an output of the multiplier, an adder having a pair of inputs each for receiving respective first and second adder operands and producing a sum of the first and second adder operands at an output of the adder, wherein the product of the first and second multiplier operands serves as the first adder operand, an accumulator memory having an input coupled to the output of the adder for storing a sum of the adder operands, and a program memory storing multiple instruction sets, each for execution on a successive clock, and each instruction set including instructions for defining respective addresses in said memories from which constants, elements and sums are to be accessed, a scheduler coupled to the program memory and configured to maintain a schedule of multiple threads executable by the processor in parallel, said schedule indicating for each of said threads whether the thread is available or idle, and the scheduler being configured on each successive clock to cycle through the threads and initiate a first available thread, a first selector responsive to instructions received from the program memory for selecting as the first multiplier operand for each thread a specified element from the data memory or the product of the first and second multiplier operands, a second selector responsive to instructions received from the program memory for selecting as the second multiplier operand for each thread a specified element from the data memory or a constant accessed from the constants memory or the product of the first and second multiplier operands, and a third selector responsive to instructions received from the program memory for selecting as the second adder operand for each thread either a sum stored in the accumulator memory or a constant stored in the constants memory.

Inventive Concept 2:

The processor as defined in inventive concept 1, being configured to compute $x^{2y+z}+c$, where x is an element stored in the data memory, c is a constant stored in the constants memory, y is a natural number such that y≥0 and z∈(0,1), the processor executing instructions to:
  (a) convey the element x from the data memory to the multiplier as both the first and second multiplier operands;
  (b) if y>1 wait for the multiplier to complete the computation and recycle the multiplier output to both inputs of the multiplier as the first and second multiplier operands and repeat for a further y−1 cycles;
  (c) if z=1 wait for the multiplier to complete the computation and convey the element x to the multiplier and recycle the multiplier output to the multiplier as the first and second multiplier operands, respectively; and
  (d) wait for the multiplier to complete the computation and convey the output from the multiplier together with the constant c from the constants memory as the first and second adder operands, respectively.

Inventive Concept 3:

The processor as defined in inventive concept 1 or 2, being further configured to compute $y_j=\Sigma(x_i \times c_{j,i})$ where $x_i$ is an element stored in the data memory, $y_j$ is the result of the computation, $c_{j,i}$ is a constant stored in the constants memory, and i, j are natural numbers, the processor executing instructions to:
  (e) convey the element $x_i$ from the data memory as the first multiplier operand to the multiplier;
  (f) convey the constant $c_{j,i}$ from the constants memory as the second multiplier operand to the multiplier;
  (g) wait for the multiplier to complete the computation and convey the output from the multiplier as the first adder operand to the adder;
  (h) convey the partial sum $y_j$ from the accumulator memory as the second adder operand to the adder;
  (i) wait for the adder to complete the computation and write the output from the adder to the accumulator memory as a new partial sum $y_j$;
  (j) repeat (e) to (i) as required.

Inventive Concept 4:

The processor as defined in any one of inventive concepts 1 to 3, being further configured to compute $y_i=(x_0 \times c_i)+x_i$ where $x_i$ is an element stored in the data memory, $y_1$ is the result of the computation, $c_i$ is a constant stored in the constants memory, i is a natural number (i≥1), the processor executing instructions to:
  (k) convey the element $x_0$ from the data memory as the first multiplier operand to the multiplier;
  (l) convey the constant $c_i$ from the constants memory as the second multiplier wait for the multiplier to complete the computation and convey the output from the multiplier as the first adder operand to the adder together with the element $y_i$;
  (m) wait for the adder to complete the computation and write the output from the adder to the accumulator memory as $y_i$;
  (n) repeat (k) to (n) as required.

Inventive Concept 5:

The processor as defined in any one of inventive concepts 1 to 4, wherein at least two of the program memory, the constants memory, and the data memory are implemented by a common memory having separately addressable partitions for storing program instructions, adder constants and multiplier constants.

Inventive Concept 6:

A core comprising:
  at least one processor as defined in any one of inventive concepts 1 to 5, and
  a ring node configured to convey an element in the data memory to the corresponding data memory in another processor in said core or to the corresponding data memory in another processor in another like core.

Inventive Concept 7:

The core as defined in inventive concept 6, wherein the ring node includes a register for storing one or more elements in a queue each of said elements being conveyed in turn from the register to the data memory at a location thereof in a namespace of an available thread.

Inventive Concept 8:

The core as defined in inventive concept 7 or 8, having at least two processors which share at least one of the constants memory, the data memory and the accumulator memory.

Inventive Concept 9:

A system comprising:
  at least two cores as defined in any one of the inventive concepts 6 to 8 coupled in a ring,
  a host interface connected in said ring and configured to convey data to a specified one of the cores along the respective ring nodes of all interconnecting cores,
  a computer configured to run a software application that requires computation of the function for which each constituent processor is intended and which is configured to convey elements to the data memory via direct memory access.

Inventive Concept 10:

The system as defined in inventive concept 9, wherein the function is a hash function and the processor is configured to:
  (a) compute $x_i^{2y+z}+c_i$ where $x_i$ is an element stored in the data memory, $c_i$ is a constant stored in the constants memory, y is a natural number such that y≥0 and z∈(0,1),
  (b) multiply the result of (a) by a full matrix by successive computations of $y_j=\Sigma(x_i \times c_{j,i})$ where $x_i$ is an element stored in the data memory, $y_j$ is the result of the computation, $c_{j,i}$ is a constant stored in the constants memory, i, j are natural numbers;
  (c) repeat (a) and (b) for a specified number of cycles;
  (d) multiply the result of (c) by a sparse matrix by successive computations of $y_i=(x_0 \times c_{j,i})+x_i$ where $x_i$ is an element stored in the data memory, $y_j$ is the result of the computation, $c_{j,i}$ is a constant stored in the constants memory, and i, j are natural numbers (i≥1);
  (e) repeat (d) for a specified number of cycles;
  (f) repeat (a) to (c) on the result of (e); and (g) output the value of $x_i$ for a designated value of i as the result of the hash function;

wherein:

for each computation of (a) the processor executes instructions to:
  i) convey the element $x_i$ from the data memory to the multiplier as both the first and second multiplier operands;
  ii) if y>1 wait for the multiplier to complete the computation and recycle the multiplier output to both inputs of the multiplier as the first and second multiplier operands and repeat for a further y−1 cycles;
  iii) if z=1 wait for the multiplier to complete the computation and convey the element $x_i$ to the multiplier and recycle the multiplier output to the multiplier as the first and second multiplier operands, respectively; and
  iv) wait for the multiplier to complete the computation and convey the output from the multiplier together with the constant c from the constants memory as the first and second adder operands, respectively;

for each computation of (b) the processor executes instructions to:
  v) convey the element $x_i$ from the data memory as the first multiplier operand to the multiplier;
  vi) convey the constant $c_{j,i}$ from the constants memory as the second multiplier operand to the multiplier;
  vii) wait for the multiplier to complete the computation and convey the output from the multiplier as the first adder operand to the adder;
  viii) convey the partial sum $y_j$ from the accumulator memory as the second adder operand to the adder;
  ix) wait for the adder to complete the computation and write the output from the adder to the accumulator memory as a new partial sum $y_j$;
  x) repeat (v) to (ix) as required; and for each computation of (d) the processor executes instructions to:
  xi) convey the element $x_{i0}$ from the data memory as the first multiplier operand to the multiplier;
  xii) convey the constant $c_{j,i}$ from the constants memory as the second multiplier operand to the multiplier;
  xiii) wait for the multiplier to complete the computation and convey the output from the multiplier as the first adder operand to the adder together with the element $y_i$;
  xiv) wait for the adder to complete the computation and write the output from the adder to the accumulator memory; and
  xv) repeat (xi) to (xiv) as required.

Inventive Concept 11:

The system as defined in inventive concept 9 or 10, wherein the corresponding ring node coupled to each of a specified number, $\lambda$, of processors is further configured to:

(h) direct the corresponding result $x_i$ of the hash function determined by each of said processors from an input of the same number $\lambda$ of elements or hash results to a designated processor in the system for computing the result $x'_i$ of the hash function for the specified number $\lambda$ of elements or results $x_i$, and (i) repeat (h) as required in respect of further hash results until only a single hash result is left.

Inventive Concept 12:

The system as defined in any one of inventive concepts 9 to 11, wherein multiple processors are configured for computing in parallel the result $x_i$ of the hash function of the specified number $\lambda$ of elements or hash results for multiple elements and hash functions.

Inventive Concept 13:

The system as defined in any one of inventive concepts 9 to 12, wherein:
  each element is identified by a respective ID equal to an original element ID Mod $\lambda$, and
  each hash result is identified by a respective Hash ID equal to an original Hash ID/$\lambda$.

Inventive Concept 14:

The system as defined in any one of inventive concepts 9 to 13, wherein at least two of the respective program memory, the constants memory, and the data memory of at least one processor in one core of the system are implemented by a common memory having separately addressable partitions for storing program instructions, adder constants and multiplier constants.

Inventive Concept 15:

The system as defined in any one of inventive concepts 9 to 14, wherein at least one of the constants memory, the data memory and the accumulator memory in at least one core of the system is shared by more than one processor in said at least one core.

The invention claimed is:

1. A multi-thread processor for computing a function requiring only modular multiplications and modular additions, the processor comprising:

a constants memory for storing a plurality of constants, a data memory for storing a plurality of multi-bit elements, a multiplier having a pair of inputs each for receiving respective first and second multiplier operands and producing a product of the first and second multiplier operands at an output of the multiplier, an adder having a pair of inputs each for receiving respective first and second adder operands and producing a sum of the first and second adder operands at an output of the adder, wherein the product of the first and second multiplier operands serves as the first adder operand, an accumulator memory having an input coupled to the output of the adder for storing a sum of the adder operands, and a program memory storing multiple instruction sets, each for execution on a successive clock, and each instruction set including instructions for defining respective addresses in said memories from which constants, elements and sums are to be accessed, a scheduler coupled to the program memory and configured to maintain a schedule of multiple threads executable by the processor in parallel, said schedule indicating for each of said threads whether the thread is available or idle, and the scheduler being configured on each successive clock to cycle through the threads and initiate a first available thread, a first selector responsive to instructions received from the program memory for selecting as the first multiplier operand for each thread a specified element from the data memory or the product of the first and second multiplier operands, a second selector responsive to instructions received from the program memory for selecting as the second multiplier operand for each thread a specified element from the data memory or a constant accessed from the constants memory or the product of the first and second multiplier operands, and a third selector responsive to instructions received from the program memory for selecting as the second adder operand for each thread either a sum stored in the accumulator memory or a constant stored in the constants memory.

2. The processor according to claim 1, being configured to compute $x^{2y+z}+c$, where x is an element stored in the data memory, c is a constant stored in the constants memory, y is a natural number such that $y \geq 0$ and $z \in (0, 1)$, the processor executing instructions to:
(a) convey the element x from the data memory to the multiplier as both the first and second multiplier operands;
(b) if y>1 wait for the multiplier to complete the computation and recycle the multiplier output to both inputs of the multiplier as the first and second multiplier operands and repeat for a further y−1 cycles;
(c) if z=1 wait for the multiplier to complete the computation and convey the element x to the multiplier and recycle the multiplier output to the multiplier as the first and second multiplier operands, respectively; and
(d) wait for the multiplier to complete the computation and convey the output from the multiplier together with the constant c from the constants memory as the first and second adder operands, respectively.

3. The processor according to claim 1, being configured to compute $y_j = \Sigma(x_i \times c_{j,i})$ where $x_i$ is an element stored in the data memory, $y_j$ is the result of the computation, $c_{j,i}$ is a constant stored in the constants memory, and i, j are natural numbers, the processor executing instructions to:
(a) convey the element $x_i$ from the data memory as the first multiplier operand to the multiplier;
(b) convey the constant $c_{j,i}$ from the constants memory as the second multiplier operand to the multiplier;
(c) wait for the multiplier to complete the computation and convey the output from the multiplier as the first adder operand to the adder;
(d) convey the partial sum $y_j$ from the accumulator memory as the second adder operand to the adder;
(e) wait for the adder to complete the computation and write the output from the adder to the accumulator memory as a new partial sum $y_j$;
(f) repeat (a) to (e) as required.

4. The processor according to claim 1, being configured to compute $y_i = (x_0 \times c_i) + x_i$ where $x_i$ is an element stored in the data memory, $y_i$ is the result of the computation, $c_i$ is a constant stored in the constants memory, i is a natural number ($i \geq 1$), the processor executing instructions to:
(a) convey the element $x_0$ from the data memory as the first multiplier operand to the multiplier;
(b) convey the constant $c_i$ from the constants memory as the second multiplier operand to the multiplier;
(c) wait for the multiplier to complete the computation and convey the output from the multiplier as the first adder operand to the adder together with the element $y_i$;
(d) wait for the adder to complete the computation and write the output from the adder to the accumulator memory as $y_i$;
(e) repeat (a) to (d) as required.

5. The processor according to claim 1, wherein at least two of the program memory, the constants memory, and the data memory are implemented by a common memory having separately addressable partitions for storing program instructions, adder constants and multiplier constants.

6. A core comprising:
at least one processor according to claim 1, and
a ring node configured to convey an element in the data memory to the corresponding data memory in another processor in said core or to the corresponding data memory in another processor in another like core.

7. The core according to claim 6, wherein the ring node includes a register for storing one or more elements in a queue each of said elements being conveyed in turn from the register to the data memory at a location thereof in a namespace of an available thread.

8. The core according to claim 6, having at least two processors which share at least one of the program memory, the constants memory, the data memory and the accumulator memory.

9. A system comprising:
at least two cores according to claim 6 coupled in a ring,
a host interface connected in said ring and configured to convey data to a specified one of the cores along the respective ring nodes of all interconnecting cores,
a computer configured to run a software application that requires computation of the function for which each constituent processor is intended and which is configured to convey elements to the data memory via direct memory access.

10. The system according to claim 9, wherein the function is a hash function and the processor is configured to:
(a) compute $x_i^{2y+z}+c_i$ where $x_i$ is an element stored in the data memory, $c_i$ is a constant stored in the constants memory, y is a natural number such that $y \geq 0$ and $z \in (0, 1)$,
(b) multiply the result of (a) by a full matrix by successive computations of $y_j = \Sigma(x_i \times c_{j,i})$ where $x_i$ is an element stored in the data memory, $y_j$ is the result of the computation, $c_{j,i}$ is a constant stored in the constants memory, i, j are natural numbers;
(c) repeat (a) and (b) for a specified number of cycles;
(d) multiply the result of (c) by a sparse matrix by successive computations of $y_i = (x_0 \times c_{j,i}) + x_i$ where $x_i$ is an element stored in the data memory, $y_i$ is the result of the computation, $c_{j,i}$ is a constant stored in the constants memory, and i, j are natural numbers ($i \geq 1$);
(e) repeat (d) for a specified number of cycles;
(f) repeat (a) to (c) on the result of (e); and
(g) output the value of $x_i$ for a designated value of i as the result of the hash function;
wherein:
for each computation of (a) the processor executes instructions to:
i) convey the element $x_i$ from the data memory to the multiplier as both the first and second multiplier operands;
ii) if y>1 wait for the multiplier to complete the computation and recycle the multiplier output to both inputs of the multiplier as the first and second multiplier operands and repeat for a further y−1 cycles;
iii) if z=1 wait for the multiplier to complete the computation and convey the element $x_i$ to the multiplier and recycle the multiplier output to the multiplier as the first and second multiplier operands, respectively; and
iv) wait for the multiplier to complete the computation and convey the output from the multiplier together with the constant $c_{j,i}$ from the constants memory as the first and second adder operands, respectively;
for each computation of (b) the processor executes instructions to:

v) convey the element $x_i$ from the data memory as the first multiplier operand to the multiplier;
vi) convey the constant $c_{j,i}$ from the constants memory as the second multiplier operand to the multiplier;
vii) wait for the multiplier to complete the computation and convey the output from the multiplier as the first adder operand to the adder;
viii) convey the partial sum $y_j$ from the accumulator memory as the second adder operand to the adder;
ix) wait for the adder to complete the computation and write the output from the adder to the accumulator memory as a new partial sum $y_j$;
x) repeat (v) to (ix) as required; and for each computation of (d) the processor executes instructions to:
xi) convey the element $x_0$ from the data memory as the first multiplier operand to the multiplier;
xii) convey the constant $c_{j,i}$ from the constants memory as the second multiplier operand to the multiplier;
xiii) wait for the multiplier to complete the computation and convey the output from the multiplier as the first adder operand to the adder together with the element $y_i$;
xiv) wait for the adder to complete the computation and write the output from the adder to the accumulator memory; and
xv) repeat (xi) to (xiv) as required.

11. The system according to claim 9, wherein the corresponding ring node coupled to each of a specified number, $\lambda$, of processors is configured to:

(j) direct the corresponding result $x_i$ of the hash function determined by each of said processors from an input of the same number $\lambda$ of elements or hash results to a designated processor in the system for computing the result $x'_i$ of the hash function for the specified number $\lambda$ of elements or results $x_i$, and
(k) repeat (h) as required in respect of further hash results until only a single hash result is left.

12. The system according to claim 10, wherein multiple processors are configured for computing in parallel the result $x_i$ of the hash function of the specified number $\lambda$ of elements or hash results for multiple elements and hash functions.

13. The system according to claim 11, wherein:
each element is identified by a respective ID equal to an original element ID Mod $\lambda$, and
each hash result is identified by a respective Hash ID equal to an original Hash ID/$\lambda$.

14. The system according to claim 9, wherein at least two of the respective program memory, the constants memory, and the data memory of at least one processor in one core of the system are implemented by a common memory having separately addressable partitions for storing program instructions, adder constants and multiplier constants.

15. The system according to claim 9, wherein at least one of the program memory, the constants memory, the data memory and the accumulator memory in at least one core of the system is shared by more than one processor in said at least one core.

* * * * *